United States Patent [19]
Grinberg et al.

[11] Patent Number: 4,745,546
[45] Date of Patent: May 17, 1988

[54] COLUMN SHORTED AND FULL ARRAY SHORTED FUNCTIONAL PLANE FOR USE IN A MODULAR ARRAY PROCESSOR AND METHOD FOR USING SAME

[75] Inventors: Jan Grinberg, Los Angeles; Donald H. Close, Santa Monica; Robert D. Etchells, Topanga, all of Calif.

[73] Assignee: Hughes Aircraft Company, Los Angeles, Calif.

[21] Appl. No.: 392,207

[22] Filed: Jun. 25, 1982

[51] Int. Cl.[4] ............................................. G06F 15/16
[52] U.S. Cl. ...................................... 364/200; 364/736
[58] Field of Search ... 364/200 MS File, 900 MS File

[56] References Cited

U.S. PATENT DOCUMENTS

| | | | |
|---|---|---|---|
| 3,106,698 | 10/1963 | Unger | 382/41 |
| 3,701,976 | 10/1972 | Shively | 364/200 |
| 3,815,095 | 7/1974 | Wester | 364/200 |
| 3,979,728 | 9/1976 | Reddaway | 364/200 |
| 4,065,808 | 12/1977 | Schomberg et al. | 364/200 |
| 4,096,569 | 6/1978 | Barlow | 364/200 |
| 4,101,960 | 7/1978 | Stokes et al. | 364/200 |
| 4,144,566 | 3/1979 | Timsit | 364/200 |
| 4,145,733 | 3/1979 | Misunas et al. | 364/200 |
| 4,174,514 | 11/1979 | Sternberg | 364/200 |
| 4,215,401 | 7/1980 | Holsztynski et al. | 382/41 |
| 4,229,792 | 10/1980 | Jensen | 364/200 |
| 4,239,312 | 12/1980 | Myer et al. | 339/17 N |
| 4,251,861 | 2/1981 | Mago | 364/200 |
| 4,257,099 | 3/1981 | Appelt | 364/200 |
| 4,270,169 | 5/1981 | Hunt | 364/200 |
| 4,270,170 | 5/1981 | Reddaway | 364/200 |
| 4,275,410 | 6/1981 | Grinberg et al. | 357/68 |
| 4,310,879 | 1/1982 | Pandega | 364/200 |
| 4,314,349 | 2/1982 | Batcher | 364/900 |
| 4,374,414 | 2/1983 | Comfort et al. | 364/200 |
| 4,380,046 | 4/1983 | Fung | 364/200 |
| 4,384,273 | 5/1981 | Ackland | 364/900 |
| 4,388,686 | 6/1983 | Haid | 364/200 |
| 4,390,944 | 6/1983 | Quackenbush | 364/200 |
| 4,402,040 | 8/1983 | Evett | 364/200 |
| 4,412,285 | 10/1983 | Neches et al. | 364/200 |
| 4,412,303 | 10/1983 | Barnes | 364/900 |
| 4,468,727 | 8/1984 | Carrison et al. | 364/200 |

OTHER PUBLICATIONS

Cyre et al., WISPAC: A Parallel Array Computer for Large-Scale System Simulation, 1977, pp. 165-172.

S. F. Reddaway, DAP-A Distributed Processor, IEEE, Proceedings of the 1st Symposium on Computer Architecture, pp. 61-65 (1973).

The Massively Parallel Processor (MPP), AIAA, Proceedings of the Computers in Aerospace Conference 2, pp. 93-96 (1979).

F. L. Alt et al., "Advances in Computers", vol. 7, 1966, article by J. C. Murtha, Highly Parallel Information Processing Systems.

Proceedings of the IEEE 1981 National Aerospace and Electronics Conference, NAECON 1981, May 19-21, 1981, vol. 1, pp. 88-96, IEEE, New York, U.S., J. Dorocak et al., "Array Processor Architecture for Electronic Warfare", pp. 89-91.

IEEE Transactions on Electronic Computers, vol. EC 12, No. 6, Dec. 1963, pp. 781-790, New York, article by R. Gonzalez, "A Multilayer Iterative Circuit Computer".

*Primary Examiner*—Gary V. Harkcom
*Assistant Examiner*—Randy W. Lacasse
*Attorney, Agent, or Firm*—Kenneth W. Float; V. D. Duraiswamy; A. W. Karambelas

[57] ABSTRACT

A column shorted and full array shorted functional plane for simultaneously transferring, or shorting, data to and from the data exchange subsystems of the array processor. This functional plane nominally includes an array of pseudo-modules that architecturally corresponds to the module arrays of the other functional planes of the array processor. Thus, a pseudo-module is present in each of the elemental processors. These pseudo-modules are associated as columns that are each interconnected by a shorted plane column data exchange subsystem. These columns are, in turn, associated with column control logic circuits that each include a column memory register. A mode decode logic circuit establishes the operating configuration of the column control logic circuits.

36 Claims, 15 Drawing Sheets

COLUMN SHORTED AND FULL ARRAY SHORTED FUNCTIONAL PLANE FOR USE IN A MODULAR ARRAY PROCESSOR AND METHOD FOR USING SAME

CROSS REFERENCE TO RELATED APPLICATIONS (1) U.S. patent application Ser. No. 342,630; filed on Jan. 26, 1982 entitled "An Array Processor Architecture Utilizing Modular Elemental Processors", assigned to the assignee of the present invention and now U.S. Pat. No. 4,507,726.

(2) U.S. patent application Ser. No. 342,639 filed on Jan. 26, 1982 entitled "Modular Input Programmable Logic Circuits For Use In A Modular Array Processor", assigned to the assignee of the present invention and now U.S. Pat. No. 4,524,428.

(3) U.S. patent application Ser. No. 342,640 filed on Jan. 26, 1982 entitled "Data Exchange Subsystem For Use In A Modular Array Processor", assigned to the assignee of the present invention and now U.S. Pat. No. 4,543,642.

(4) U.S. patent application Ser. No. 342,671 filed on Jan. 26, 1982 entitled "Segregator Functional Plane For Use In A Modular Array Processor", assigned to the assignee of the present invention and now U.S. Pat. No. 4,498,134.

BACKGROUND OF THE INVENTION

The present invention generally relates to the field of computer aided data analysis and, in particular, to the highly specialized computers capable of processing two dimensionally structured data sets, generally referred to as images, that are known as Cellular Array Processors (CAP).

In the field of image processing, the Cellular Array Processor is generally well known as a type of computer system whose architecture is particularly suited for the task of image processing. Although the specific design may differ substantially between different implementations, the general architecture of the Cellular Array Processor is quite distinctive. Typically, a system will include a highly specialized Array Processor that is controlled by a Control Processor of conventional design. The Array Processor, in turn, is formed from a large number of elemental processors that are distributed as individual cells within a regular matrix. (This gives rise to the descriptive name "Cellular Array Processor".) The elemental processors are essentially identical and generally contain a function-programmable logic circuit and memory register. The programmable logic circuit is typically capable of selectively performing a limited number of primitive logic and arithmetic functions, such as "and", "or", "invert", and "rotate" on the data stored in its respective memory register in conjunction with data provided by the Control Processor. The Control Processor is linked to the Elemental Processors via a common instruction bus. Thus, all of the elemental processors operate separately, yet synchronously, in the performance of a common logical function on the data contained in their respective memory registers. (This is commonly referred to as Single Instruction, Multiple Data, or SIMD operation.)

Cellular Array Processor systems are particularly well suited for image processing applications, since the memory registers present in the cellular array permit the digital representation of the image to be mapped directly into the processor. Thus, the spatial interrelationship of the data within the two-dimensionally structured data set is intrinsically preserved. By directing the Array Processor to perform a selected sequence of SIMD logical operations corresponding to the performance of a desired image processing algorithm, the data at every point in the image can be processed essentially in parallel. Naturally, both the effective processing speed (the product of the number of instructions per second executed by an Elemental Processor and the number of Elemental Processors operating simultaneously) and the resolution of the image being processed can be increased directly by the use of additional elemental processors.

Although the Cellular Array Processor architecture is a relatively recent development within the more general field of computer aided data analysis, a substantial number of systems utilizing the architecture have been developed. While many of the systems were specifically designed for general application purposes, quite a number have been designed for considerably more specialized applications. Descriptions of a number of the general application systems can be found in S. F. Reddaway, DAP—A Distributed Processor, IEEE, Proceedings of the First Symposium on Computer Architecture, pp. 61-65 (1973), General Purpose Array Processor, U.S. Pat. No. 3,815,095 issued to Aaron H. Wester on June 4, 1974, K. E. Batcher, Array Processor, U.S. Pat. No. 3,979,728 issued to Stewart Reddaway on Sept. 7, 1976, The Massively Parallel Processor (MPP) System, AIAA, Proceedings of The Computers in Aerospace Conference 2, pp. 93-97 (1979), and Parallel Type Processor with a Stacked Auxiliary Fast Memories, U.S. Pat. No. 4,144,566 issued to Claude Timsit on Mar. 13, 1979. A number of the more specialized systems are described in Floating Point Arithmetic Unit for a Parallel Processing Computer, U.S. Pat. Nos. 3,701,976 issued to Richard Shivety on Oct. 31, 1972 Network Computer System, 4,065,808 issued to Hermann Schomberg et al on Dec. 27, 1977 and Scientific Processor, 4,101,960 issued to Richard Stokes et al on July 18, 1978.

In each of these system implementations, a significantly different elemental processor design is used in order to tailor the array processors for their anticipated applications. This is principally due to the extremely wide variety of their possible applications and equally wide variety of subcomponents that can be utilized. However, a common feature of these elemental processors is that a high degree of component interconnection is used in order to optimize the elemental processor processing speed.

The particular disadvantage of using highly optimized elemental processor designs is that any significant change in the anticipated data processing application will require the elemental processors to be substantially redesigned in order to preserve the system's overall data processing capability and efficiency. This is a practical consequence of the fact that the subcomponents are too highly specialized and innerconnected to allow any significant alteration or extension of the elemental processors' component composition.

SUMMARY OF THE INVENTION

An array processor architecture utilizing a distinctly modular elemental processor design is disclosed in the copending companion applications. The array processor is comprised of a plurality of modular elemental processors. A data exchange subsystem interconnects the modules of each elemental processor to provide for data transfer. These modules are of a number of different functional types, such as memory and accumulator and nominally include an input-programmable logic circuit and a closely associated memory register. The modules of the array processor are associated so that the elemental processors are architecturally parallel to one another. The transfer of data within the array processor, based on the simultaneous transfer of data via the data exchange subsystems of the elemental processors, is thereby correspondingly parallel. The modules are also architecturally associated as functional planes lying transverse to the elemental processors. A functional plane is thereby comprised of an array of modules that are each otherwise associated with a separate elemental processor. Further, the modules of a functional plane are of a common functional type. This allows the data of a two-dimensionally structured data set, as present within the memory registers of a functional plane's modules, to be processed identically and in parallel by successively passing the data set to functional planes of selected functional types.

A control processor is utilized to direct the operation of the array processor. They are interconnected by means of an array/control processor interface that allows the control processor to randomly address and configure each of the array processor's functional planes. It also allows the control processor to exchange data with the array processor.

Within the array processor architecture, the present invention provides a means for transferring, or shorting, data to and from the data exchange subsystems of the array processor. This is provided, in accordance with the present invention, by a column shorted and full array shorted functional plane. This functional plane nominally includes an array of pseudomodules that corresponds with the module arrays of the other functional planes of the array processor. Thus, a pseudomodule is present in each of the elemental processors.

Within the shorted functional plane, the pseudomodules are associated as columns that are each interconnected by a shorted plane column data exchange subsystem. These columns are, in turn, associated with column control logic circuits that each include a column memory register. A mode decode logic circuit establishes the operating configuration of the column control logic circuits.

The shorted functional plane can be selectively configured for a number of different modes. These modes provide for the transfer of data: (1) from the control processor commonly to all of the data exchange subsystems of the array processor, (2) from the top row, corner pseudo-module's data exchange subsystem commonly to the remaining data exchange subsystems, (3) from the column memory registers commonly to the data exchange subsystems of their respective pseudomodule columns, (4) from the data exchange subsystems of the top row of pseudo-modules commonly to the data exchange subsystems of their respective pseudo-module columns, (5) ORed from all of the data exchange subsystems of the array processor to the control processor, and (6) ORed from the data exchange subsystem of each column of pseudo-modules to their respective column memory registers. Utility modes for transferring data between the control processor and the column memory registers are also provided.

Thus, an advantage of the present invention is that the time necessary to tranfer an entire image data set to one or more of the functional planes of the Array Processor is substantially reduced.

Another advantage of the present invention is that common data can be simultaneously provided to all of the elemental processors of the array processor.

A further advantage of the present invention is that separate data can be simultaneously transferred to the elemental processors of the respective columns of the array processor, common data being transferred to each of the elemental processors of a given column.

Still another advantage of the present invention is that an entire image data set, created from data provided by either a single elemental processor or a number of elemental processors, can be simultaneously created and transferred to one or more of the functional planes of the array processor.

A still further advantage of the present invention is that data derived from data provided by all of the elemental processors of the array processor, or from the separate columns thereof, can be transferred to the control processor as an indication of the nature of the data present within the array processor.

Yet still another advantage of the present invention is that a plurality of shorted functional planes can be provided within the array processor and oriented so that row, as well as column, data transfer operations can be performed within the array processor.

BRIEF DESCRIPTION OF THE DRAWINGS

These and other attendant advantages of the present invention will become apparent and readily appreciated as the same becomes better understood by reference to the following detailed description when considered in connection with the accompanying drawings, in which like reference numerals designate like parts throughout the figures and wherein:

FIGS. 5b and c are circuit details of open collector and open drain buffer circuits, respectively, that may be used in conjunction with the circuit shown in FIG. 5a;

DETAILED DESCRIPTION OF THE INVENTION

I. Overview of the Modular Array Processor Architecture

As previously explained, a general Cellular Array Processor (CAP) system is comprised of two principal components: one, an Array Processor and, two, a Control Processor that is used to direct the operation of the Array Processor. The present invention provides for an Array Processor having a modular, and therefore highly flexible, architectural design that is particularly well suited for use in CAP systems. It should be understood, however, that the present invention is in fact the modular architecture disclosed. It is conceptually distinct from any particular physical embodiment, even though it may be best described in physical terms. However, the intended mode of physically embodying the present invention is disclosed in "Three-Dimensionally Structured Microelectronic Device", U.S. Pat. No. 4,275,410 issued to Jan Grinberg et al. on June 23, 1981, and "Parallel Interconnect for Planar Arrays", U.S. Pat. No. 4,239,312 issued to Jon H. Myer et al. on Dec. 16, 1980, both of which are assigned to the assignee of the present invention.

Figure 1:
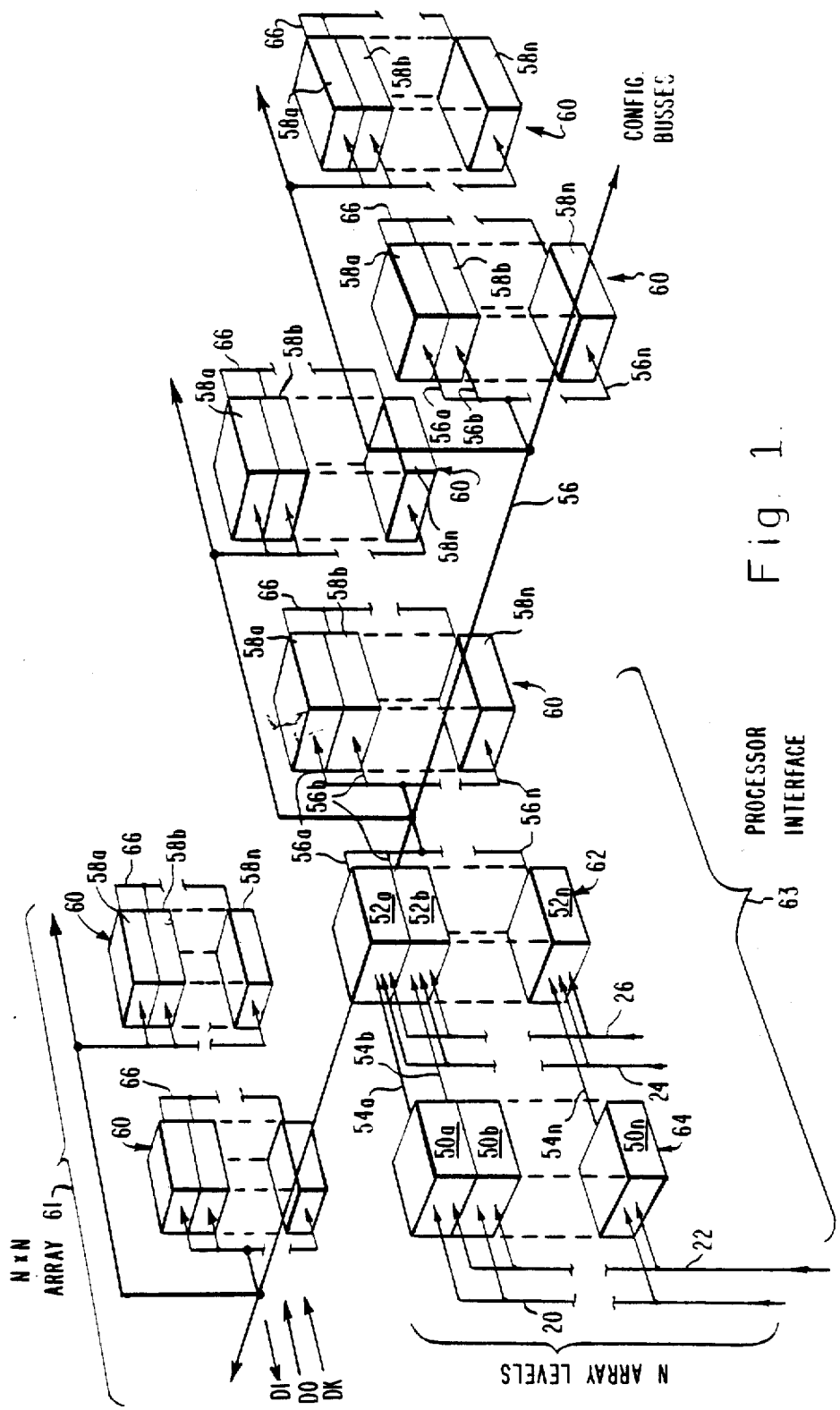
FIG. 1 is a schematic block diagram of a Modular Array Processor.

Accordingly, the Array Processor 61 and Processor Interface 63 of the preferred architectural embodiment of the present invention are shown in FIG. 1. The Array Processor 61 is comprised of a plurality of Elemental Processors 60 that are distributed as cells within a regular N×N array, thereby topologically matching the distribution of pixels within an image or, equally, the data points present within any two dimensionally structured data set. This is in keeping with conventional CAP system designs.

The Elemental Processors 60 are essentially identical, each being composed of a plurality of Modules 58 operatively interconnected by a Data Exchange Subsystem utilizing a common Data Bus 66. Architecturally, the Elemental Processors 60, in forming the Array Processor 61, occupy a three dimensional space, wherein the Modules 58 are distributed on a plurality of array levels that are parallel to, and overlie, one another. The Elemental Processors 60 extend in parallel across these array levels so that each contains a module in the corresponding N×N module arrays present on the different array levels.

The Modules 58 are, based on their design, generally similar to one another. They are essentially independent units within their respective Elemental Processors 60 and are generically comprised of an input-programmable logic circuit and a closely associated memory register. The logic circuit utilizes bit-serial circuitry to perform a number of related logical and data-manipulative operations on data received from the Data Exchange Subsystem in conjunction with the data present in its corresponding memory register. The logic circuit is specifically programmed, or configured, to perform a particular logical operation by establishing the appropriate combination of logic signals at its inputs. That is, the particular logic state of each of the programmable inputs determines whether corresponding sections or subfunctions of the logic circuit are enabled or disabled, thereby configuring the logic circuit for a particular logical operation.

The Modules 58, however, are of a number of functionally distinct types, each having an input-programmable logic circuit of a different, though basically similar, design. The different functional types of modules may include those that function as memories, accumulators, counters, and comparators. Design examples of these are shown in FIGS. 6, 9, 11, and 12, and will be discussed in greater detail below. It should be understood that practically any basic data manipulation function can be implemented as a Module 58 within an Elemental Processor 60 so long as the design of its logic circuit is consistent with those of the design examples. That is, the input-programmable logic circuit must: (1) be of a standard logic design, such as bit-serial arithmetic, (2) provide all of the logical and data manipulation operations that are required by and consistent with its general functional type, including data storage and transfer, and (3) include a data transfer circuit, typically consisting of a data transmitter and receiver, so that the Modules 58 share a common means of data exchange. Thus, the functional types of modules are not limited to those mentioned above.

The Elemental Processors 60 are thus formed from a plurality of Modules 58 that are operatively interconnected by their respective Data Exchange Subsystems 74. Each plurality of Modules 58 may include any number of each functional type. However, in keeping with general CAP system designs which require each Elemental Processor, or cell, to be functionally identical, each of the composite Elemental Processors 60 must contain like numbers of each functional type of Module 58. Further, in order for the Array Processor 61 to operate as a SIMD machine, again in keeping with general CAP system designs, the Modules 58 architecturally present on each array level should be of the same functional type. Thus, each module array forms a functional plane, such as a memory plane or an accumulator plane, that lies transverse to the Elemental Processors 60 within the Array Processor 61. In addition, the Modules 58 that form a given functional plane must be operatively connected in common for control purposes so as to always simultaneously execute a common logical function, thereby inherently establishing the SIMD operation of the Array Processor 61.

Figure 5A:
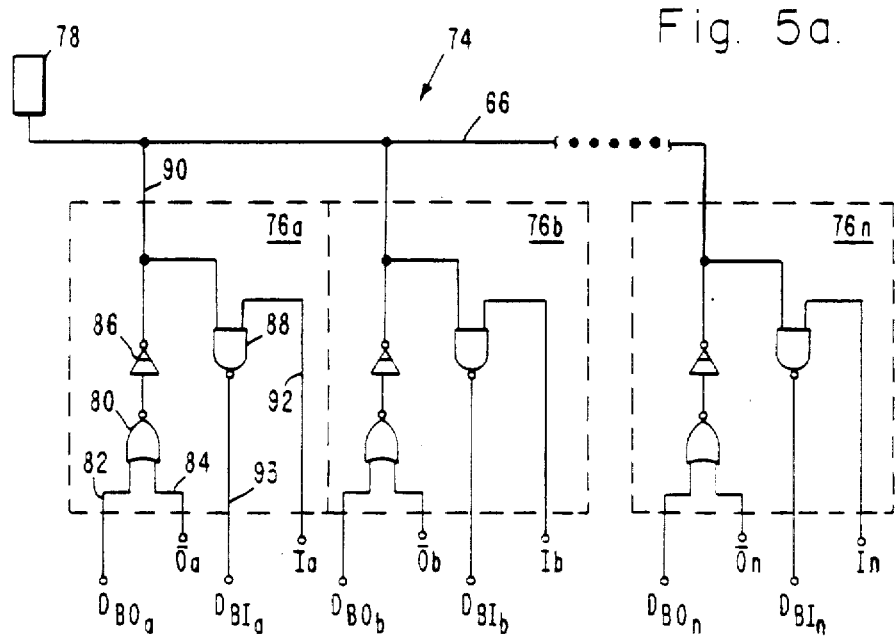
FIG. 5a is a schematic circuit diagram of the Data Exchange Subsystem which includes a data bus and its associated interface logic for commonly interconnecting a number of modules so as to form an Elemental Processor such as that shown in FIG. 4.

As previously mentioned, the Modules 58 present in a composite Elemental Processor 60 are principally interconnected for the purpose of intermodule transfer of data by a Data Exchange Subsystem, such as the one shown in FIG. 5a. This subsystem is comprised of a Data Bus 66 and a plurality of essentially identical Data Bus Interface Circuits 76a-n, each being present in a respective Module 58 of the composite elemental processor 60. The Bus Interfaces 76 are, in fact, integral sections of their corresponding input-programmable logic circuits.

The Data Bus 66 is a common interconnection between all of the Bus Interfaces 76 that are present in the Modules 58 of a composite Elemental Processor 60. This commonality allows any number of Modules 58 to be incorporated into an Elemental Processor 60, with each effectively being architecturally (and electrically) equidistant from the other. Thus, the Elemental Processors 60 may be optimally configured for either a particular or a general application by the incorporation of an appropriate number of each functional type of Module 58 therein.

The Data Exchange Subsystem 74 allows for the transfer of serial data between any number of Modules 58 within the composite Elemental Processor 60. To provide serial data on the common Data Bus 66, at least one Bus Interface 76 must be configured to transmit data as it is serially shifted from its respective memory register onto the Data Bus 66. Considering the case where two or more Modules 58 are configured to serially transmit their respective and typically different data, the subsystem effectively functions to logically AND the data together. It thereby resolves any bit-conflict in the respective serial data by forcing the transmission of a logical 0 onto the Data Bus 66 at that time. In order for data to be received by one or more Modules 58, their respective Bus Interfaces 76 must be configured to transfer serial data from the data bus to their respective input-programmable logic circuits. The data may then be serially shifted into its respective memory register or operated on by the input-programmable logic circuit, with the product therefrom then being shifted into the memory register. Thus, in the case of two or more Modules 58 receiving data simultaneously, the data is either simply copied into a number of memory registers or logically operated on consistent with any of the module function types present in the composite Elemental Processor 60, or both. Finally, the Modules 58 not configured for either transmitting or receiving data must be effectively, or functionally, disconnected from the Data Bus 66. This is accomplished by configuring their Bus Interfaces 76 to continuously transmit a logical 1 onto the bus 66. This allows the subsystem, by virtue of its data conflict resolving ability, to effectively ignore those Modules 58 not actively transmitting or receiving data. Thus, inactive Modules 58 are electrically, but not functionally connected to their respective Data Busses 66.

Figure 2:
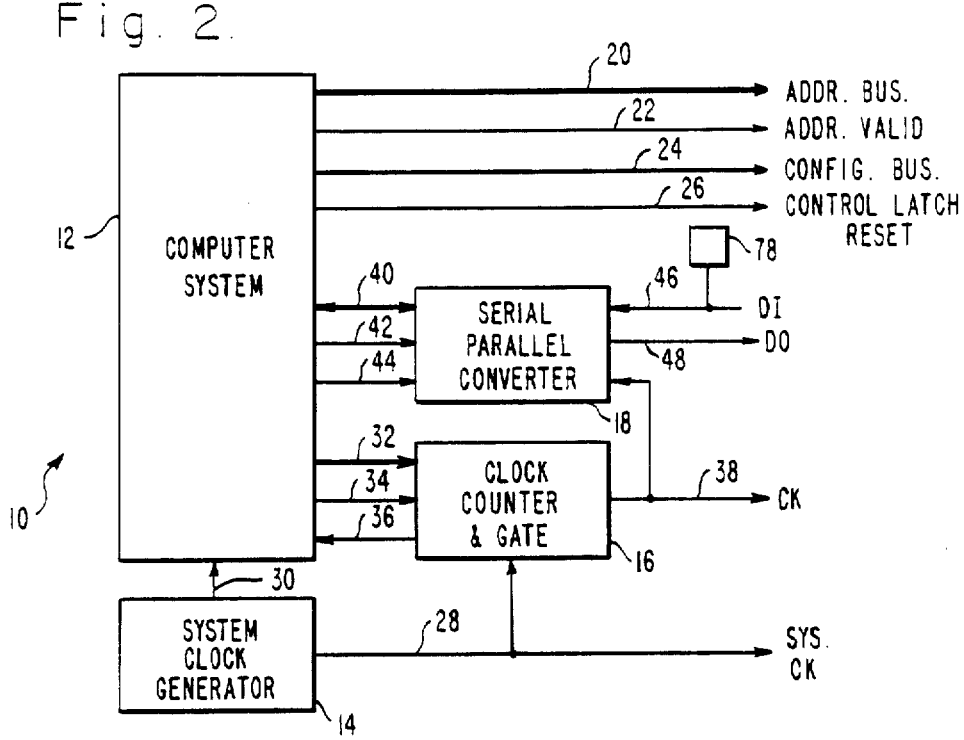
FIG. 2 is a schematic block diagram of a Control Processor suitable for directing the operation of the Array Processor.

The Control Processor 10, shown in FIG. 2, is operatively connected to the Modules 58 of the Array Processor 61 by the Processor Interface 63, shown in FIG. 1. The Processor Interface 63 is comprised of a plurality of individual interface circuits 49, such as the one shown in FIG. 3. An Interface Circuit 49 is architecturally present on each array level and consists of an Address Decoder 50 and a Configuration Latch 52, the inputs of each being connected to the Control Processor 10 by an Address Bus 20 and a Control Bus 24, respectively. The outputs of the Configuration Latch 52 are, in turn, connected to the programmable inputs of the input-programmable logic circuits contained in the Modules 58 of its corresponding functional plane, i.e. present on its respective array level. More specifically, the corresponding programmable inputs of the logic circuits are respectively connected together, each then being connected to a separate output of the Configuration Latch 52 by means of the configuration Bus 56. Thus, the Control Processor 10 can selectively address and write a preselected control word into each of the Configuration Latches 52. Since each bit of a control word establishes the logic state of a common input of its corresponding input-programmable logic circuits, the control word effectively defines the functional configuration of all of the Modules 58 present in its respective functional plane. Consequently, the Control Processor 10 is provided with a simple means of separately configuring each functional plane within the Array Processor 61.

The general operation of the Array Processor 61, as previously mentioned, is directed by the Control Processor 10, shown in FIG. 2. The Control Processor 10 includes a Computer System 12 of conventional design and is capable of providing for program storage and sequencing, data storage and I/O data buffering, and random access to the interface circuits 49 of the Array Processor Interface 63.

Figure 13:
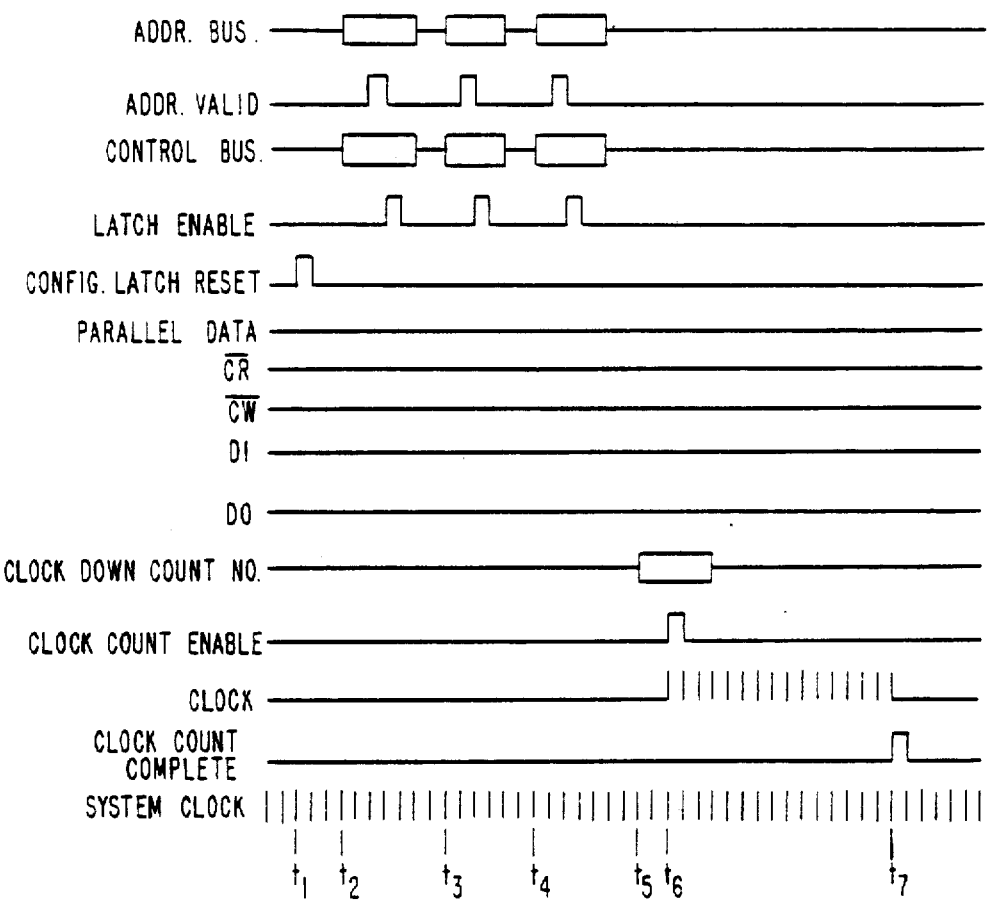
FIG. 13 is a schematic timing diagram for explaining the data level shift operation of the Array Processor according to the present invention.

The programs executed by the Control Processor 10 are naturally based on image processing algorithms. These algorithms are generally well-known in the art and can be used in conjunction with the Array Processor 61 to perform such tasks as signal analysis, involving Fourier transforms and matrix multiplication, and image analysis, involving contrast enhancement, edge definition, and object location. Each algorithm establishes a particular series of logical functions that must be performed on the image data set in order to extract the desired information. These logical functions can be conveniently performed by the Array Processor 61 by basically directing it to transfer a data set that has previously been mapped into the memory registers of one functional plane to those of another functional plane of the desired functional type. A succession of these data set transfers, or level shifts, even with a minimum of different functional types of Modules 58, can be used to implement practically any image processing algorithm. The particular steps necessary to perform a level shift are shown in FIG. 13 and will be discussed in greater detail below.

II. Detailed Description of the Modular Array Processor

A. The Control Processor

A Control Processor System 10, such as the one shown in FIG. 2, is required to direct the operation of the Array Processor 61. It necessarily includes a digital computer system 12 of conventional design, such as a high speed, bit-slice system as typified by an Advanced Micro Devices AMD2901 microprocessor based system It should be understood, however, that the present invention is not directed at the design of the Control Processor 10, but rather at a complete array processor system that includes a Control Processor. Thus, the Control Processor's necessary capabilities, and general means for providing them, are described below for purposes of completeness.

The Control Processor 10 must be capable of supplying all of the signals necessary to interface with the Array Processor Interface 63 for purposes of controlling the Array Processor 61. Accordingly, the Control Processor 10 must be capable of providing an array level select address on the Address Bus 20 for randomly accessing the interface circuits 49 of the Processor Interface 63. The number of parallel lines in the Address Bus 20 is preferably ten, or at least the logarithm to the base 2 of the number of array levels that may be randomly selected. The Control Processor must be capable of providing a control word of 16 bits in length on the Control Bus 24, there being preferably 16 parallel lines therein. In conjunction with the address and control word, the Control Processor 10 must provide an Address Valid signal on the Address Valid line 22 for indicating that the address and its corresponding control word are stable on their respective busses. Finally, it must be capable of providing a Configuration Latch Reset signal on the Reset line 26 for resetting the bits of all of the configuration latches present in the Processor Interface 63 to their inactive states.

The Control Processor 10 must also be capable of providing a stable, high speed (preferably around 10 MHz) System Clock Signal (SYS CK). A standard clock generator 14 can be used to provide the necessary SYS CK signal on the System Clock line 28. It may also provide a signal on line 30 to ultimately synchronize the computer system 12 with the Array Processor 61.

The Control Processor 10 must further be capable of gating a preselected number of clock pulses derived from SYS CK onto the Array Processor Clock (CK) line 38. This may be accomplished through the use of a clock counter and gate 16 that includes a standard down counter circuit and an AND gate. A CK pulse count number is provided to the input latch of the clock counter and gate 16 by means of a unidirectional data bus 32. The operation of the clock counter and gate 16 is initiated by a Down-Count Enable signal on control line 34. In response, the Clock Counter and Gate 16 enables the transfer of SYS CK pulses onto the CK line 38 by means of the AND gate while counting down the preselected number of SYS CK pulses. At the completion of the down count, the clock counter and gate 16 disables the transfer of SYS CK pulses and provides the computer system 12 with a Down-Count Complete Signal on control line 36.

Finally, the Control Processor system 10 must also provide for the serial exchange of data (data I/O) with the Array Processor 61 on the Data In/Data Out lines 46, 48. This may be accomplished with the use of a standard serial-to-parallel and parallel-to Serial Converter 18 (converter). Single data words from a two-dimensionally structured data set that has been temporarily stored in, or buffered by, the Computer System 12 may be transferred in parallel to the Converter 18 by means of the bidirectional Data Bus 40. There, each parallel data word, having a preferred word length of 16 bits, is serially transferred to the Array Processor 61 via the Data Out (DO) line 48. Conversely, a serial data word from a data set stored in the Array Processor 61 can be transferred to the Converter 18 via the Data In (DI) line 46. The data word is then converted to parallel and transferred to the Computer System 12 over the Data Bus 40.

Figure 3:
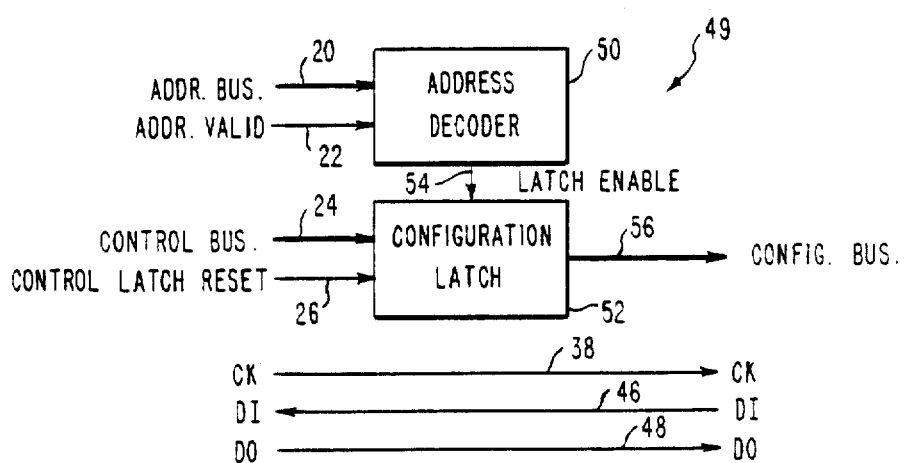
FIG. 3 is a schematic block diagram detail of the Control Processor/Array Processor interface.
Figure 4:
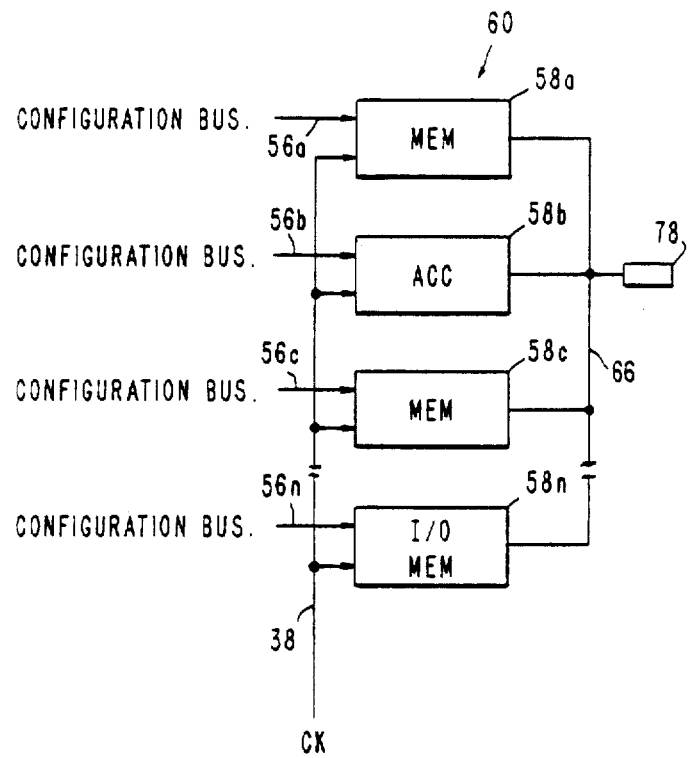
FIG. 4 is a schematic block diagram detail of an Elemental Processor used in the Array Processor of FIG. 1.

Control lines 42, 44 are provided by the Computer System 12 for respectively controlling the serial data in, parallel data word read operation and the parallel data word write, serial data out operation of the Converter 18. The serial/parallel conversion of data by the Converter 18 is in response to, and synchronous with, the CK pulses as provided by the Clock Counter and Gate 16 to the Converter 18 on the Clock Signal line 38. The CK pulses are also, simultaneously, provided to the Array Processor 61. Thus, the clock down-count number directly determines the word length of the data to be exchanged between the Control Processor 10 and the Array Processor 61. As shown in FIG. 3, the CK, DI and DO lines 38, 46, 48 are passed through each of the Interface Circuits 49 and made available to the functional planes on their corresponding array levels.

B. Array Processor

As previously explained, the Array Processor 61 is comprised of a plurality of Elemental Processors 60 which are, in turn, comprised of a plurality of Modules 58 of several different functional types. The Modules 58 are associated so that, conceptually, the Elemental Processors 60 are parallel, thereby providing for a parallel flow of data within the Array Processor 61. Since the Modules 58 of each Elemental Processor 60 are interconnected only by the single Data Bus 66 of their respective Data Exchange Subsystems, the data flow therein is accurately described as bit-serial. However, it can also be described as word-parallel, due to the common and simultaneous operation of the parallel Elemental Processors 60. This word-parallel, bit-serial operation allows the Array Processor 61 to effectively process an entire image at one time. Further, this type of operation allows the use of fairly simple serial arithmetic circuitry in the implementation of the logic circuits of the various functional types of modules.

In order to provide the common word-parallel, bit-serial mode of operation, the Modules 58 are further associated as functional planes transverse to the Elemental Processors 60, each plane being composed of a common funtional type of Module 58 present on an array level of the Array Processor 61. The several types of Modules 58 thereby provide for such functional planes as memory, accumulator, counter, and comparator.

C. Processor Interface

The Control Processor 10 is operatively associated with each of the functional planes by a respective one of the interface circuits 49 which, together, comprise the Processor Interface 63, shown in FIG. 1. Referring now to FIG. 3, each Interface Circuit 49 consists of a single, preferably 16 bit wide, word parallel data latch 52 and an associated Address Decoder 50. The Address and Address Valid inputs of the Address Decoder 50 and the Data and Latch Reset inputs of the Configuration Latch 52, along with the corresponding inputs of all of the interface circuits 49 of the Processor Interface 63, are respectively connected to the parallel lines of the Address Bus 20, the Address Valid line 22, the Control Bus 24 and the Configuratiqn Latch Reset line 26. Each Address Decoder 50 is also operatively connected to its respective Configuration Latch 52 by a latch enable line 54. The data outputs of the Configuration Latches 52 as thereby provided form a plurality of configuration buses 56 that are each operatively associated with a separate functional plane of the Array Processor 61.

Considering now the operation of the Processor Interface 63, each Address Decoder 50 present therein is responsive to a particular array level select address that is provided by the Control Processor 10 on the Address Bus 20. Thus, the operation of a particular Interface Circuit 49 is initiated when the Address Decoder 50 detects its corresponding address on the Address Bus 20 in the presence of the Address Valid signal on the Address Valid line 22. The Address Decoder 50, at that point, generates a latch enable signal on the latch enable line 54. In response, the Configuration Latch 52 latches in the control word as provided by the Control Processor 10 in conjunction with the array level select address and, therefore, currently present on the Control Bus 24. Once latched, the respective bits of the control word directly establish the logic states of the signals present on the separate parallel lines of the Configuration Bus 56. The control word, as present in the Latch 52, remains stable until either a new control word is addressed to the Latch 52 or a Configuration Latch Reset signal is received on the Reset line 26.

D. Memory Functional Plane

Figure 6:
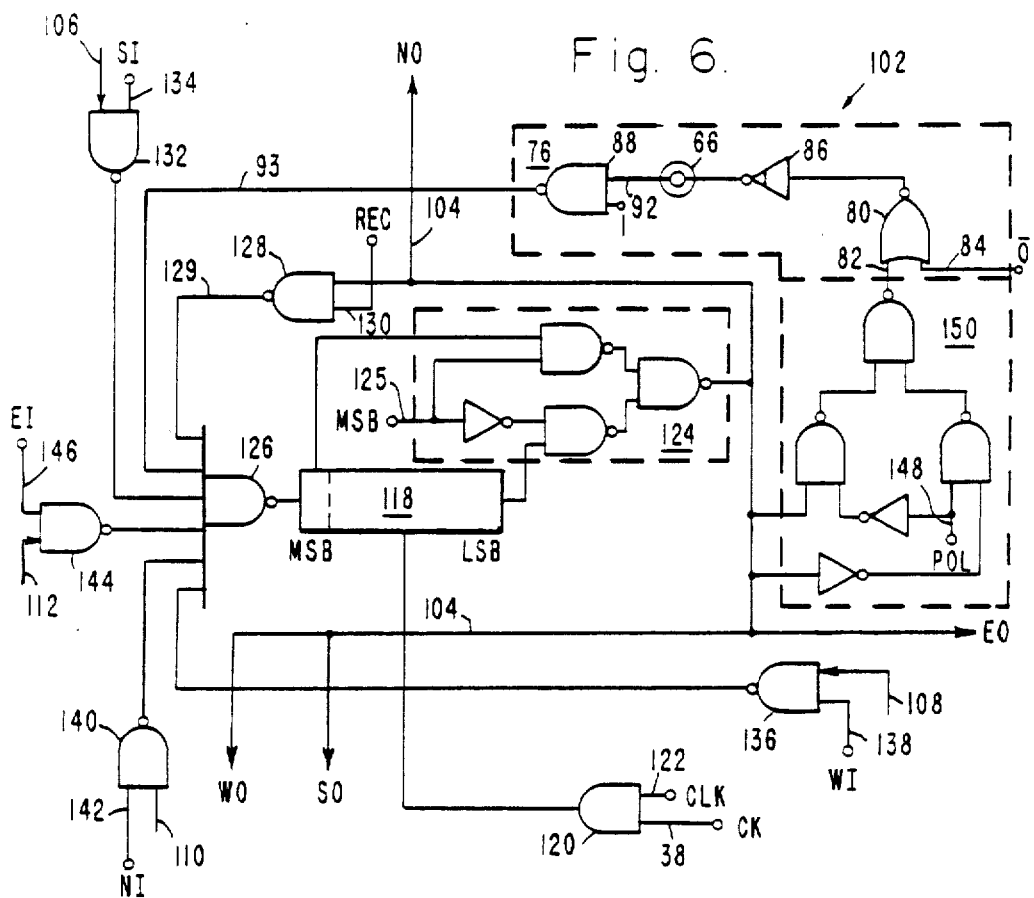
FIG. 6 is a schematic block and circuit diagram of the memory register and Input Programmable Logic Circuit of the memory functional type of module.

The functional type of a particular Module 58, as well as its corresponding functional plane, is determined by the particular design of its input-programmable logic circuit. A memory type input-programmable logic circuit is shown in FIG. 6. The various programmable inputs are listed along with their functional definition in Table I.

The Memory Module is designed to have two major functions. The first is to provide for the storage of a single data word from a two-dimensionally structured data set. This allows an entire image to be mapped directly into a Memory Functional Plane, thereby inherently preserving the spatial interrelationship of its constituent data words. The second function is to provide for the lateral transfer of its data word to the corresponding Memory Module of an adjacent Elemental Processor, i.e., to one of the four nearest neighboring modules within its functional plane. This function, when considered in terms of the entire Memory Functional Plane, permits an entire image to be laterally shifted in any one of the four orthogonal directions within the plane without loss of the image's spatial integrity. Accordingly, a Memory Logic Circuit capable of providing these functions is now described.

The central component of the Memory Logic Circuit 102, as shown in FIG. 6, is naturally a Memory Register 118, preferably having a length of 16 bits. The Clock Enable signal, when applied to the CLK programmable input of the AND gate 120, enables the application of a preselected number of clock pulses, as provided by the Control Processor 10 on the CK line 38, to the Memory Register 118. Each clock pulse applied causes the data contained in the Memory Register 118 to be shifted right by one bit, thereby providing for the serial transfer of data both to and from the Memory Register 118. Thus, when CK pulses are applied, serial data from the Most Significant Bit (MSB) or Least Significant Bit (LSB) of the Memory Register 118, depending on the logic state of the MSB programmable input 125, is transferred through the Data Selector Circuit 124 to the nearest neighbor output line 104. The serial data is thereby made available to each of the four nearest neighboring Memory Modules within its respective functional plane. The data on the nearest neighbor output line 104 is also provided to the Polarity Selection Circuit 150 wherein the polarity of the data is either inverted or noninverted according to the logic state of the POL programmable input 148. The data therefrom is then provided to the data transmitter section of the memory module's Data Bus Interface Circuit 76 via the data line 82. There, the data is combined with the Output Enable signal on the $\overline{O}$ programmable input line 84 by the NOR gate 80. This results in either the data or a logical 1 being buffered by the open collector output buffer 86 onto the data bus line 66 and thereby made available to the other Modules 58 of its respective Elemental Processor 60.

TABLE I

| Bit | Mnemonic | Name | Active State | Function |
|---|---|---|---|---|
| | | Configuration Bus Inputs for Memory Functional Plane | | |
| 1 | I | Input | High | Enables data input through the Data Exchange Subsystem. |
| 2 | O | Output | Low | Enables data output through the Data Exchange Subsystem. |
| 3 | POL | Polarity | High | Inverts the data polarity as it is being transferred from the memory register to the Data Exchange Subsystem. |
| 4 | CLK | Clock Enable | High | Enables application of CK pulses to the shift register. |
| 5 | MSB | Most Significant Bit | High | Selects the transfer of the most significant bit of data in the memory register to the Data Exchange Subsystem. |
| | | | Low | Selects the serial transfer of data through the Least Significant Bit position of the memory register to the Data Exchange Subsystem. |
| 6 | REC | Recirculate | High | Enables the recirculation of data from the LSB to the MSB position of the memory register during shifting. |

TABLE I-continued

| Bit | Mnemonic | Name | Active State | Function |
|---|---|---|---|---|
| 7 | NI | North Data In Enable | High | Enables the reception of data from the south nearest neighboring Memory Module. |
| 8 | EI | East Data In Enable | High | Enables the reception of data from the west nearest neighboring Memory Module. |
| 9 | SI | South Data In Enable | High | Enables the reception of data from the north nearest neighboring Memory Module. |
| 10 | WI | West Data In Enable | High | Enables the reception of data from the east nearest neighboring Memory Module. |
| Additional Inputs and Outputs | | | | |
| | CK | Clock | Pulse | Shifts the data in the memory register one position to the right; edge sensitive, low when inactive. |

Figure 5B:
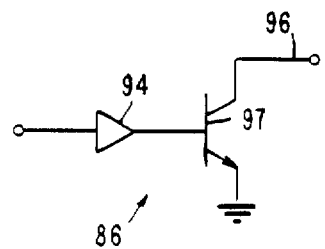
Figure 5C:
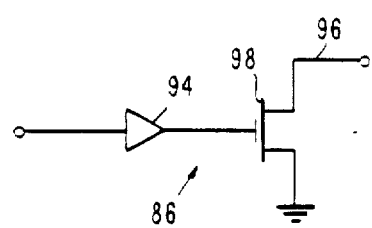

It should be understood that either a standard open collector, grounded emitter bipolar output buffer, such as shown in FIG. 5b, or an open drain, grounded source FET output buffer such as shown in FIG. 5c, may be used, depending on the family of logic used, to implement the module logic circuits.

Data is also serially input into the Memory Register 118 through its MSB position when CK pulses are applied. This input data is provided by the multiple input NAND gate 126 as the product of data from a number of different sources. One such source is the data receiver section of the Data Bus Interface Circuit 76. There, a logical NAND gate 88 is used to combine the data Input Enable signal present on the I programmable input line 92 with the data present on the Data Bus 66. Either the serial data received or a logical 1 is thereby provided to the NAND gate 126 via its input line 93, depending on the logic state of the data Input Enable signal.

Another source of data is the Memory Register 118 itself. Data output from the register onto the Nearest Neighbor Data Output line 104 is combined with the Recirculation Enable signal as applied to the REC programmable input 130 of the NAND gate 128, thereby providing either the inverted data recirculated from the output of the Memory Register 118 or a logical 1 to the NAND gate 126 via its input line 129.

The remaining sources of data are the four nearest neighboring Memory Modules. In each case, the data present on the Nearest Neighbor Data Output lines 106, 108, 110, 112 are combined with their corresponding directional Input Enable signals on the SI, WI, NI, EI programmable inputs, 134, 138, 142, 146 of the logical NAND gates 132, 136, 140, 144, respectively. Either the inverted data from a nearest neighboring module or a logical 1 is thereby provided by each as an input to the NAND gate 126.

Figure 7:
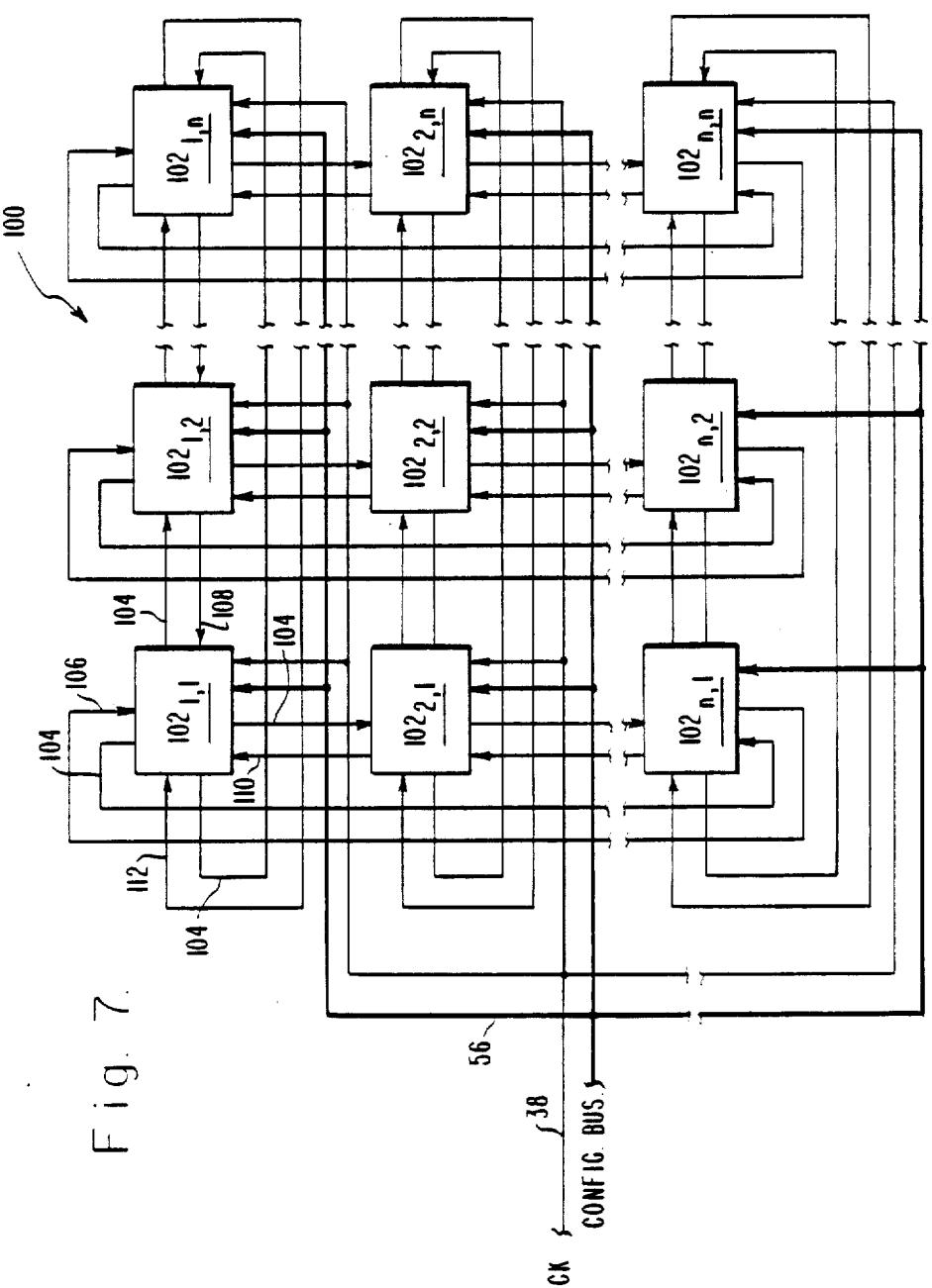
FIG. 7 is a schematic block diagram of a Memory Functional Plane consisting of an array level of memory function modules.

A Memory Functional Plane 100, conceptually taken as a cross-section of the Array Processor 61 transverse to its Elemental Processors 60 is shown in FIG. 7. The Modules 58 containing the memory input-programmable logic circuits 102 are shown distributed as an N×N array. The logic circuits 102 of the Memory Functional Plane 100 are interconnected, for purposes of bidirectional serial data transfer, to each of their four nearest neighbors. Considering the corner module $102_{1,1}$ of the functional plane 100, it provides data to its neighboring modules, $102_{1,2}$, $102_{1,n}$, and and $102_{n,1}$, by means of the Nearest Neighbor Data Output line 104. The corner module $102_{1,1}$ also receives data from each of its nearest neighboring modules by means of their respective Nearest Neighbor Data Output lines 108, 112, 110, 106. Thus, as can be seen, the nearest neighbor interconnections wrap around the module array of the Memory Functional Plane 100 so that no data is lost at any edge boundary of the N×N array.

For purposes of control, the modules' logic circuits 102 are commonly connected to the configuration Bus 56 of the Interface Circuit 49 corresponding to the Memory Functional Plane 100. The programmable inputs of each of the module input-programmable logic circuits 102 are connected so that each of the parallel lines of the Bus 56 is commonly connected to all of the programmable inputs of a given type. Thus, all of the module input-programmable logic circuits 102 present in the Memory Functional Plane 100 are always operatively configured identical to one another, since the logic states of their programmable inputs are commonly established by the control word present in the data latch 52 of its corresponding processor Interface Circuit 49.

Finally, the clock pulses generated by the Clock Counter and Gate 16 of the Control Processor 10 are commonly provided to the input-programmable logic circuits by means of the clock line 38.

E. I/O Functional Plane

Figure 8:
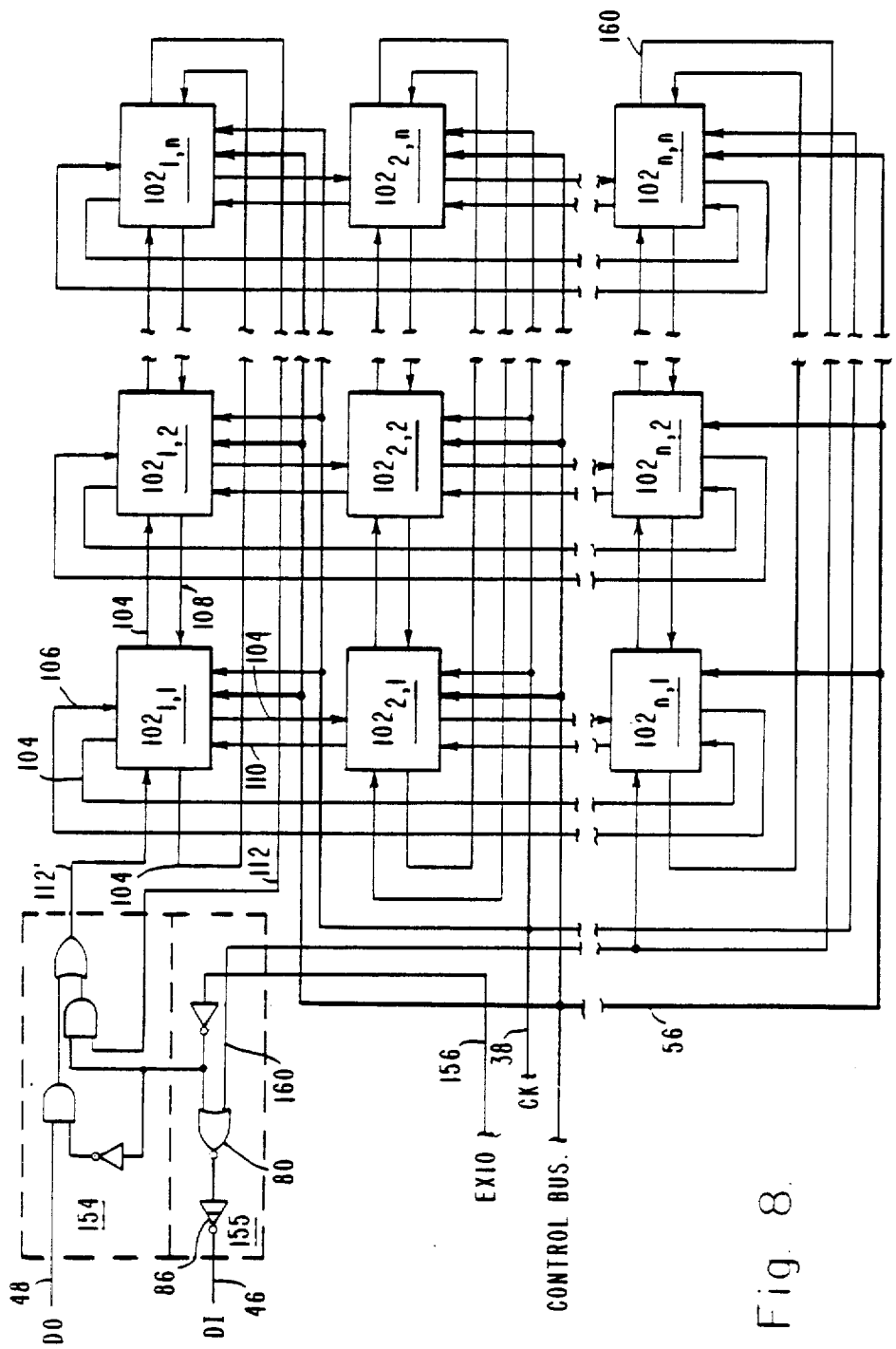
FIG. 8 is a schematic block and circuit diagram of the Memory Functional Plane, as shown in FIG. 7, modified to permit serial input/output data exchange with the Control Processor system.

The I/O function plane 152, as shown in FIG. 8, is essentially a Memory Functional Plane that has been modified to permit the serial exchange of data with the Control Processor 10. Table II provides a listing and functional description of the various inputs and outputs required by the I/O Functional Plane.

The I/O Functional Plane 152 is substantially identical to the Memory Functional Plane 100. They differ, however, in that the I/O functional Plane 152 includes a serial Data Receiver/Selector 154 for selecting between data provided by the Control Processor 10 on the DO line 48 and the data provided by the neighboring Memory Module $102_{1,n}$ on its Nearest Neighbor Data Out line 112. The data from either source is provided to the Memory Logic Circuit $102_{1,1}$ on its East Data in line 112'. The selection between these two sources of data depends on the External I/O signal present on the EXIO programmable input 156. The I/O Functional Plane 152 also includes the serial Data Transmitter Circuit 155. This circuit is functionally identical to the data transmitting portion of the Bus Interface Circuit 76. The Nearest Neighbor Data Out line 160 of the Memory Logic Circuit $102_{n,n}$ provides data to the Data Transmitter Circuit 155. This data is combined with the External I/O signal on the EXIO programmable input line 156 by a NOR gate 80 and buffered onto the DI line 46 by the Open Collector Buffer Circuit 86.

TABLE II

| Bit | Mnemonic | Name | Active State | Function |
|---|---|---|---|---|
| | | Configuration Bus Inputs for I/O Functional Plane | | |
| 1 | I | Input | High | Enables data input through the Data Exchange Subsystem. |
| 2 | O | Output | Low | Enables data output through the Data Exchange Subsystem. |
| 3 | POL | Polarity | High | Inverts the data polarity as it is being transferred from the memory register to the Data Exchange Subsystem. |
| 4 | CLK | Clock Enable | High | Enables application of CK pulses to the shift register. |
| 5 | MSB | Most Significant Bit | High | Selects the transfer of the most significant bit of data in the memory register to the Data Exchange Subsystem. |
| | | | Low | Selects the serial transfer of data through the Least Significant Bit position of the memory register to the Data Exchange Subsystem. |
| 6 | REC | Recirculate | High | Enables the recirculation of data from the LSB to the MSHB position of the memory register during shifting. |
| 7 | NI | North Data In Enable | High | Enables the reception of data from the south nearest neighboring Memory Module. |
| 8 | EI | East Data In Enable | High | Enables the reception of data from the west nearest neighboring Memory Module. |
| 9 | SI | South Data In Enable | High | Enables the reception of data from the north nearest neighboring Memory Module. |
| 10 | WI | West Data In Enable | High | Enables the reception of data from the east nearest neighboring Memory Module. |
| 11 | EXIO | External I/O Enable | High | Enables the bidirectional serial transfer of data between the Memory Module array and the Control Processor across the DI/DO bus lines. |
| | | Additional Inputs and Outputs | | |
| | CK | Clock | Pulse | Shifts the data in the memory register one position to the right; edge sensitive, low when inactive. |
| | DI | Data In | N/A | Unidirectional serial data bus for transfering data from the Array Processor to the Control Processor. |
| | DO | Data Out | N/A | Unidirectional serial data bus for the transfer of data from the Control Processor to the Array Processor. |

Similar to the operation of the Data Bus Interface Circuits 76, either the data present on the Nearest Neighbor Data Out line 160 or a logical 1 is transmitted, the selection depending on the logic state of the EXIO signal. Thus, when the EXIO signal on its programmable input 156 is a logical 0, the Data Receiver/Selector circuit 154 provides the top row, corner Memory Logic Circuit $102_{1,1}$ with data from the Nearest Neighbor Data Out line 112 while the Data Transmitter Circuit 155 transmits a logical 1 onto the DI line 46. In this configuration, the I/O Functional Plane 152 is operatively identical to the Memory Functional Plane 100. In the converse configuration, when the EXIO signal is a logical 1, the data receiver/selector 154 provides the top row, corner Memory Logic Circuit $102_{1,1}$ with data derived from the Control Processor 10 via the DO line 48, while the Data Transmitter Circuit 155 serially transmits data from the Nearest Neighbor Data Out line 160 of the bottom row, corner Memory Logic Circuit $102_{n,n}$ to the Control Processor 10 via the DI line 46.

F. Accumulator Functional Plane

Figure 9:
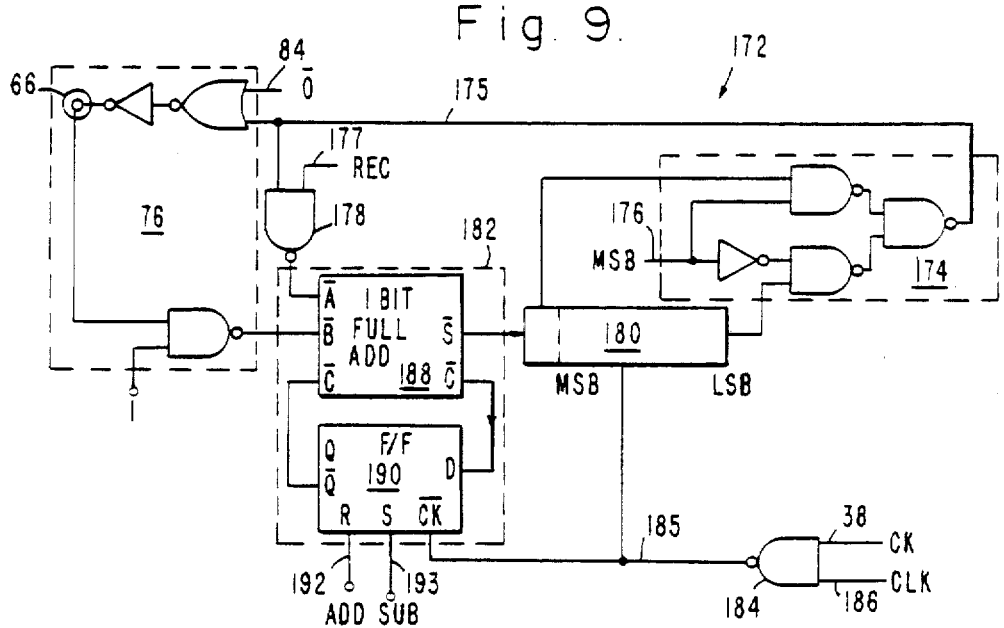
FIG. 9 is a schematic block and circuit diagram of an accumulator functional type of module.

The Modules 58 of an Accumulator Functional Plane each contain an accumulator type input-programmable logic circuit 172, as shown in FIG. 9. Table III provides a listing and functional description of each of the programmable inputs of the Accumulator Logic Circuit 172 and, equally, of an accumulator functional plane.

The accumulator module is designed to serially sum two data words and store the result. Thus, as shown in FIG. 9, the Accumulator Logic Circuit 172 substantially consists of a Memory Register 180, preferably 16 bits in length, and a 1-Bit Full Adder with Carry circuit 182. As in the Memory Logic Circuit 102, a NAND gate 184 is used to combine the clock pulses generated by the Clock Counter and Gate 16 as provided on the CK line 38 with the Clock Enable signal on the CLK programmable input 186, thereby allowing the selective application of the clock pulses to the Memory Register 180. Upon application of each clock pulse, the Memory Register 180 acts as a serial shift register, shifting the data contained therein 1 bit to the right. Data is output from the Memory Register 180 through the Data Selector Circuit 174 to the Data Bus Interface Circuit 76. The Data Selector Circuit 174 is of conventional design and selectively transfers output data from either the Most Significant Bit or Least Significant Bit of the Memory Register 180 to its data output line 175 depending on the logic state of the Most Significant Bit signal on the MSB programmable input line 176. The transmission of data present on the data selector output line 175 onto the Data Bus 66 is dependent on the output signal present on the Bus Interface Circuit's $\overline{O}$ programmable input 84. The data may also be recirculated through the recirculation NAND gate 178 and ultimately to the Memory Register 180 depending on the logic state of the Recirculate signal present on the REC programmable input 177. The 1-Bit Full Adder with Carry preferably consists of a 1-bit full adder 188 and an appropriately connected Flip-flop 190, acting as a 1-bit carry latch. The 1-Bit Full Adder with Carry 182 receives either, or both, data being recirculated to the Memory Register 180 and input data from the data bus line 66, as provided by the Bus Interface 76.

allows the control word, as selected and written into the configuration latch 56 by the Control Processor 10, to commonly establish the logic state of each of the programmable inputs of the accumulator circuits 172. Thus, there is a common configuration of the Accumulator Logic Circuits 172 in the Accumulator Functional Plane 166 as directly selected by the Control Processor 10. The preselected number of clock pulses, as gener-

TABLE III

| Bit | Mnemonic | Name | Active State | Function |
|---|---|---|---|---|
| | | Configuration Bus Inputs for Accumulator Functional Plane | | |
| 1 | I | Input | High | Enables data input through the Data Exchange Subsystem. |
| 2 | $\bar{O}$ | Output | Low | Enables data output through the Data Exchange Subsystem. |
| 3 | CLK | Clock Enable | High | Enables application of CK pulses to the shift register. |
| 4 | MSB | Most Significant BIT | High | Selects the transfer of the most significant bit of data in the memory register to the Data Exchange Subsystem. |
| | | | Low | Selects the transfer of the Least Significant Bit of data in the memory register to be transferred to the Data Exchange Subsystem. |
| 5 | REC | Recirculate | High | Enables the recirculation of the memory register data during shifting. |
| 6 | ADD | Add | High | Resets the 1 bit full adder with carry. |
| 7 | SUB | Subtract | High | Presets the 1 bit full adder with carry. |
| | | Additional Inputs and Outputs | | |
| | CK | Clock | Pulse | Shifts the data in the memory register one position to the right; edge sensitive, low when inactive. |

The sum or difference of this data, depending on whether the ADD or SUB signal is present on their respective programmable inputs 192, 193 prior to the accumulation of data and whether the input data is true or inverted, respectively, is synchronously clocked out of the 1-Bit Full Adder with Carry 182 and into the Memory Register 180.

It should thus be apparent then that a two-step procedure is necessary to sum two data words. The first step is to serially sum a first data word into the Memory Register 180 from the Bus Interface 76. This is done with the recirculation of the data previously present in the Memory Register 180 disabled. Next, a second data word is serially input from the Bus Interface 76. At the same time, the first data word is recirculated from the Memory Register 180, both data words being synchronously applied to the 1-Bit Full Adder with Carry 182. The resulting serial sum is then shifted, also synchronously, into the Memory Register 180. This sum is then available to be summed with additional data words or to be serially transferred to another Module 58 within its respective Elemental Processor 60.

Figure 10:
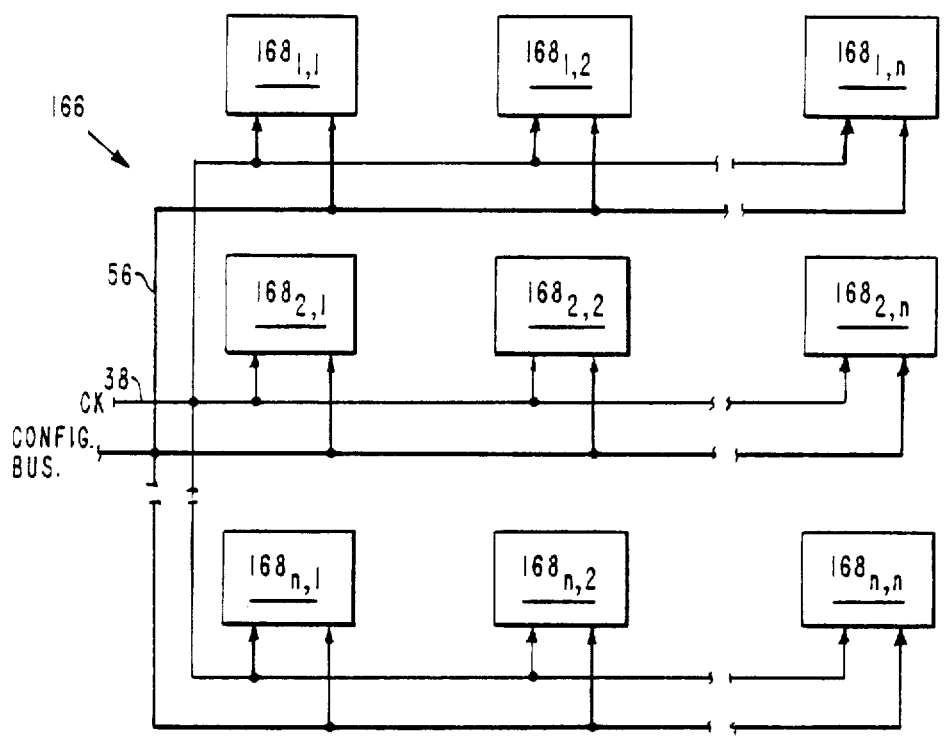
FIG. 10 is a schematic block diagram of an Accumulator Functional Plane consisting of an array level of Accumulator Modules.

An Accumulator Functional Plane 166 consisting of an N×N array of Accumulator Modules 168, each containing an accumulator input-programmable logic circuit 172, is shown in FIG. 10. As in the memory and I/O Functional Planes, the Accumulator Modules 168 are commonly connected to their corresponding processor Interface Circuit 49 by means of a configuration Bus 56. Thus, the corresponding programmable inputs of the Accumulator Logic Circuits 172 are commonly connected together and further connected to the respective parallel lines of the configuration Bus 56. This ated by the Clock Counter and Gate 16 of the Control Processor 10, are commonly provided to each of the Accumulator Modules 168 and the logic circuits 172 contained therein by the clock line 38.

G. Counter Functional Plane

Figure 11:
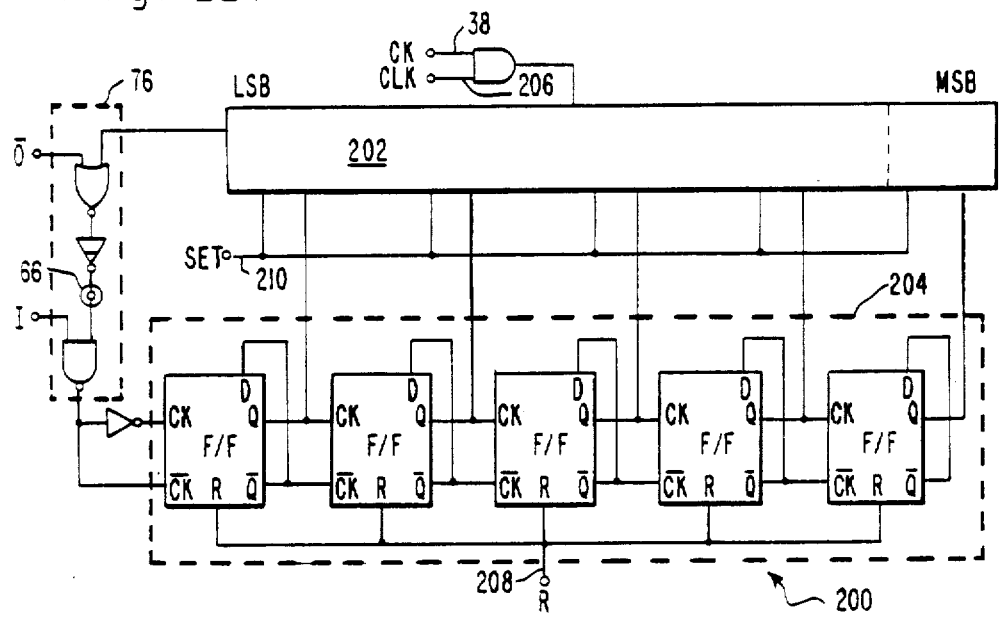
FIG. 11 is a schematic block and circuit diagram of the memory register and Input Programmable Logic Circuit of a counter functional type of module.

A counter input-programmable logic circuit is shown in FIG. 11. A listing and functional description of each of its programmable inputs and, therefore, of its corresponding Counter Functional Plane is provided in Table IV.

The Counter Logic Circuit 200 is designed to develop the bit-sum of data present on the Data Bus 66. Accordingly, the Counter Logic Circuit 200 is essentially comprised of a standard five stage binary counter 204 and a corresponding five bit Memory Register 202. In operation, data is received by the first stage of the binary counter 204 from the Data Bus 66 via the Bus Interface Circuit 76. The receiver section of the Bus Interface Circuit 76 is enabled prior and disabled subsequent to the reception of each data bit from the Data Bus 66. Each logical 1 data bit received clocks the first stage of the binary counter 204 while the reception of a logical 0 has no effect on the binary counter. Thus, the binary counter 204 counts the number of logical 1 data bits sequentially present on the Data Bus 66, thereby functioning as a 1-bit full adder. This binary count, continuously available from the outputs of the binary counter 204, can be transferred in parallel to the parallel in, serial out Memory Register 202 by the application of the Parallel Data Set signal on the SET programmable input 210.

TABLE IV

| Bit | Mnemonic | Name | Active State | Function |
|---|---|---|---|---|
| | | Configuration Bus Inputs for Counter Functional Plane | | |

TABLE IV-continued

| Bit | Mnemonic | Name | Active State | Function |
|---|---|---|---|---|
| 1 | I | Input | High | Enables data input through the Data Exchange Subsystem. |
| 2 | $\overline{O}$ | Output | Low | Enables data output through the Data Exchange Subsystem. |
| 3 | CLK | Clock Enable | High | Enables application of CK pulses to the shift register. |
| 4 | SET | Parallel Data Set | High | Enables the parallel transfer of the bit count total to the shift register. |
| 5 | R | Reset | High | Resets the bit counter. |
| | | | Additional Inputs and Outputs | |
| | CK | Clock | Pulse | Shifts the data in the memory register one position to the right; edge sensitive, low when inactive. |

The count may then be shifted out of the Memory Register 202, Least Significant Bit first, to the transmitter portion of the Bus Interface Circuit 76 in response to the application of clock pulses on the CK line 38, as enabled by the Clock Enable signal on the CLK programmable input 206. The binary counter 204 may be cleared at any time by the application of a reset signal on the R programmable input 208.

The interconnection, for control purposes, of Counter Logic Circuits 200 as a Counter Functional Plane is strictly analogous to the interconnection of the Accumulator Logic Circuits 172 in the accumulator function plane 166. The corresponding programmable inputs of the Counter Logic Circuits 200 are respectively connected together and further connected to the parallel lines of its corresponding configuration Bus 56. Thus, the operation of the Counter Logic Circuits 200 of a Counter Functional Plane is both common and synchronous.

H. Comparator Functional Plane

Figure 12:
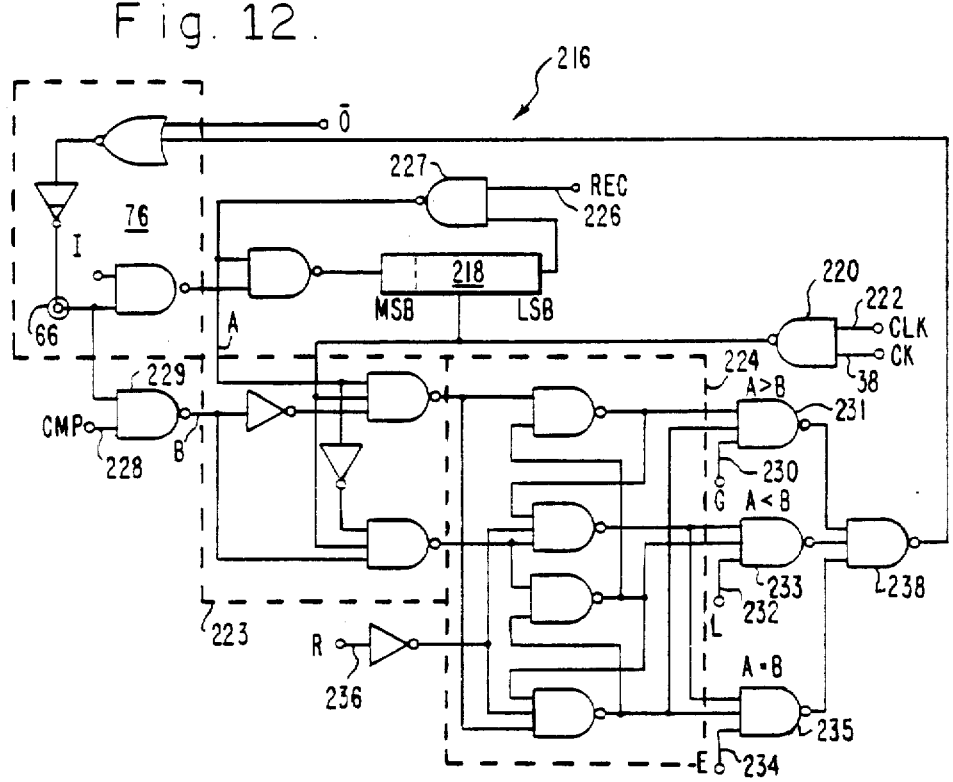
FIG. 12 is a schematic block and circuit diagram of the memory register and Input Programmable Logic Circuit of a comparator functional type of module.

A Comparator Input-Programmable Logic circuit 216 is shown in FIG. 12. Table V provides a listing and functional description of each of its programmable inputs and, equally, of its corresponding functional plane. The Comparator Logic Circuit 216 utilizes a three-step procedure to compare two data words. In the first step, a data word is received from the Data Bus 66 by the Bus Interface Circuit 76 and input into the Memory Register 218. This is done by serially shifting in the data word through the Most Significant Bit position of the Memory Register 218 in response to the application of clock pulses as provided via the NAND gate 220 by the Clock Enable signal on the CLK programmable input 222. This step is performed without providing for the recirculation of the data previously present in the Memory Register 218. That is, a logical zero is applied to the REC programmable input 226, thereby disabling the recirculation of data. The second step is the actual performance of the comparison of the data now present in the Memory Register 218 with a second data word serially provided to the logic circuit 216 over the Data Bus 66. The two data words are serially applied, least significant bit first, simultaneously to the respective inputs of the Comparator Subcircuit 223. The first data word is applied to the A input of the Comparator Subcircuit 223 by enabling the recirculation of the data word present in the memory register 218. The second data word is transferred directly from the Data Bus 66 to the B input of the Comparator Subcircuit 223 by the Compare NAND Gate 229 which is enabled by the Compare Enable signal on its CMP programmable input 228. As the two data words are serially applied, the comparator subcircuit 223 compares their corresponding bits, the cumulative result of the comparisons being stored by the Comparator State Output Latch 224. That is, the Comparator State Output Latch 224 develops three outputs, Greater Than, Less Than and Equal To, that continuously reflect the state of the comparison of the two data words. The three outputs of the Comparator State Output Latch 224 are, as implied, latched, thereby retaining the state of the cumulative comparisons until reset by the application of a reset signal on the R programmable input 236. Naturally, the second, or serial comparison, step is finished when the Most Significant Bits of both data words have been compared.

TABLE V

| Bit | Mnemonic | Name | Active State | Function |
|---|---|---|---|---|
| | | Configuration Bus Inputs for Comparator Functional Plane | | |
| 1 | I | Input | High | Enables data input through the Data Exchange Subsystem. |
| 2 | $\overline{O}$ | Output | Low | Enables data output through the Data Exchange Subsystem. |
| 3 | CLK | Clock Enable | High | Enables application of CK pulses to the shift register. |
| 4 | REC | Recirculated | High | Enables the recirculation of the memory register data during shifting. |
| 5 | R | Reset | High | Resets the Comparator State Output Latch. |
| 6 | CMP | Compare | High | Enables the transfer of serial data from the data bus to the Comparator Subcircuit. |
| 7 | G | Greater Than | High | Enables the output of the greater than comparator state latch. |
| 8 | L | Less Than | High | Enables the output of the less than comparator state latch. |
| 9 | E | Equal to | High | Enables the output of the equal to comparator state latch. |
| | | | Additional Inputs and Outputs | |

TABLE V-continued

| Bit Mnemonic | Name | Active State | Function |
|---|---|---|---|
| CK | Clock | Pulse | Shifts the data in the memory register one position to the right; edge sensitive, low when inactive. |

The third and final step of the comparison procedure is then to test for a particular comparison state on the outputs of the comparison state output Latch 224. In order to provide this, the outputs of the Latch 224 are respectively connected to three NAND gates 231, 233, 235. The outputs of the three NAND gates combined by means of the triple input NAND gate 338, with the output thereof being provided to the Bus Interface Circuit 76. Each of these gates 231, 233, 235 also has a programmable input, G, L and E, respectively, that can be used to selectively test for any one, or combination of, Comparator State Output Latch conditions, such as A>B or A≧B. Thus, if the results of a comparison between two data words is such that the first is greater than the second, following the second step of the procedure, then the A>B output of the Comparator State Output Latch will be to a logical 1. Further, if the Greater Than and Equal To signals are applied to the G and E programmable inputs 230, 234, respectively, in the third step of the procedure, then the triple input NAND gate 238 will transfer a logical 1 to the Bus Interface Circuit 76, indicating that the result of the comparison was that the first data word was either greater than or equal to the second.

As with the Counter Functional Plane, the interconnection of the Comparator Logic Circuits 216 in the comparator functional plane, for control purposes, is strictly analogous to the interconnection of the Accumulator Logic Circuits 172 in the accumulator plane 166. The corresponding programmable inputs of the Comparator Logic Circuits 216 are respectively connected together and further connected to the parallel lines of their corresponding configuration Bus 56. Thus, the operation of the Comparator Logic Circuits 216 of a comparator functional plane is inherently both common and simultaneous.

I. Data Exchange Subsystem

As previously explained, the Data Exchange Subsystem, as shown in FIG. 5a, operates to permit any of the Modules 58 within its respective composite Elemental Processor 60 to synchronously either transmit data onto or receive data from the Data Bus 66. The Data Exchange Subsystem also provides for the functional disconnection of inactive modules, from the Data Bus 66. In order to provide these functions, the Data Bus Subsystem 74 includes a Data Bus 66, a resistive load 78, a number of data receivers operatively connected to the Data Bus 66 for sensing the logic state of the data signal present thereon, and a number of data transmitters operatively connected to the Data Bus 66. In the case of the Data Exchange Subsystems used to interconnect the Modules 58 of the Elemental Processors 60, these data transmitters and receivers can be paired to form a plurality of identical Data Bus Interface Circuits 76a-n, each being present in a respective module of the composite Elemental Processor 60. The resistive load 78 is a resistor or, preferably, a resistively connected FET, that is connected between the electrically conductive bus line 66 and a voltage potential source (not shown), the voltage potential being sufficient to normally maintain the Data Bus 66 in a logical 1 state.

The preferred design of the Bus Interface Circuits 76, and therefore of the data transmitters and receivers, is described in conjunction with the memory input programmable Logic Circuit 102, Section II, D supra. Their essential features are as follows: (1) that the data output buffer 86 of the transmitter portion of the circuit 76 be of an open collector design, such as shown in FIGS. 5b-c; (2) that, when the Output Enable signal is applied to the $\overline{O}$ programmable input 84, data provided to the Bus Interface Circuit 76 on the data line 82 is transmitted onto the Data Bus 66; (3) that, when the Output Enable signal is withdrawn from the $\overline{O}$ programmable input 84, the Bus Interface Circuit generate and continuously transmit a logical 1 onto the Data Bus 66; and (4) that, when the Input Enable signal is applied to the I programmable input 92, data is received from the Data Bus 66 and made available on the data line 93. It should be apparent then that, when transmitting data, each Bus Interface Circuit 76 has the capability only to force the logic state of the Data Bus 66 to the logical zero state. Therefore, it is only when all of the Bus Interface Circuits 76a-n are transmitting a logical 1, either as data or to functionally disconnect their respective module from the Data Bus 66, that the logic state of the Data Bus 66 is a logical 1. Conversely, if any of the Bus Interface Circuits is transmitting a logical zero, the Data Bus 66 will be in a logical zero state. Thus, the Data Exchange Subsystem effectively provides the wired AND of all of the data being transmitted onto the Data Bus 66 to those Bus Interface Circuits 76 configured to receive data. Thus, conflicts in the data being transmitted are resolved by the consistent application of a logical AND rule. The desirable consequence of this is that it permits data-dependent processing by the Array Processor 66 whenever data is being transferred between functional planes. That is, the conflict resolving capability of the Data Exchange Subsystems of the Array Processor 61 can be intentionally invoked by causing two or more images to be transferred between functional planes simultaneously. The data actually transmitted by each of the Data Exchange Subsystems is naturally dependent on the respective data contained in the transmitting Modules 58 of each Elemental Processor 60. Consequently, the Array Processor 51 is capable of performing data dependent, or masking, operations wherein the resultant image is directly dependent on the respective data present in two or more images. This feature will be explained further by example in Section III(E) infra.

The common usage of the Bus Interface 76 to connect the input-programmable logic circuits to their respective Data Busses 66 substantially reduces the overall complexity of the Elemental Processors 60 and, therefore of the entire Array Processor 61. It permits the logic circuits to be designed and implemented substantially, if not totally independent of one another, the design being constrained only to the requirements of input programmability, the use of bit-serial arithmetic and data manipulation, and the utilization of a Bus Interface 76. By providing for the common interconnection of an Elemental Processor's modules (which correspond to the highly interconnected subcomponents of the prior art's "cell" Elemental Processors) via a single Data Bus 66, the architecture of the Elemental Processors 60 is simplified.

The Data Exchange Subsystem also simplifies the alteration or extension of the architecture of the Elemental Processors 60. Since each Module 58 connects to its respective Data Bus 66 via a single data line 90 that is common to both the data transmitter and receiver of its Bus Interface 76, Modules 58 can be either added or removed from an Elemental Processor by appropriately connecting or disconnecting their data lines 90 from the Data Bus 66. Further, the architecture may be extended without any direct effect on the optimization or speed of the Elemental Processor. It is only the practical limitation of signal propagation delays along the length of the bus line 66 that limits the number of Modules 58 that may be present in a composite Elemental Processor 60.

The Data Exchange Subsystem, however, is not limited to being used only to interconnect the Modules 58 of the elemental processors 60. It may be advantageously used anywhere serial data must be exchanged between a number of logic circuits via a bus line. For example, a functionally equivalent Data Exchange Subsystem is utilized to interconnect the Parallel/Serial Converter 18 of the Control Processor 10 with all of the I/O Functional Planes of the Array Processor 61. A resistive load 78, as shown in FIG. 2, is connected to, and normally maintains, the DI data bus 46 in a logical 1 state. The output buffer 86 of the data transmitters 155 present on each I/O Functional Plane (see FIG. 8) for driving data onto the DI data bus 46 is intentionally of an open collector design. Further, the disabled state of the data transmitters 155 is such that they continuously drive a logical one onto the DI data bus 46. Naturally, the data receiver of the I/O Data Exchange Subsystem is the Serial/Parallel Converter 18, the receiving of data being enabled by the clock pulses as provided on the CK line 38. Thus, all of the I/O Functional Planes are commonly connected to the Converter 18 of the Control Processor 10 by an I/O Data Exchange Subsystem.

It should also be understood that Data Exchange Subsystems could easily be operated in parallel in order to transfer parallel data words.

III OPERATION

A. Level Shift

As previously mentioned, the principal operation of the Array Processor 61 in the processing of an image is to consecutively shift the image's constituent data words in parallel through a succession of functional planes. These level shifts can be utilized to implement the particular steps of a desired image processing algorithm by shifting the image data set, along with ancillary or image derivative data sets, through a succession of functional planes of appropriate types.

The particular steps necessary to perform a level shift involving a number of functional planes are shown in the system timing diagram of FIG. 13. At $t_1$, the Control Processor 10 issues a Configuration Latch Reset signal to the Processor Interface 63 via the Latch Reset line 26. This signal resets the data bits in all of the Configuration Latches 52 to the inactive state of their corresponding programmable inputs. Next, the Control Processor 10 successively addresses any number of the interface circuits 49 of the Processor Interface 63, writing a control word into each of their Configuration Latches 52. Naturally, each of these control words is functionally defined only in terms of the functional plane corresponding to the Interface Circuit 49 to which they are addressed. The control word for configuring a functional plane to perform a particular function can be determined by resort to the Tables I-V. For example, to configure a memory functional plane for a level shift of the data contained in its memory registers, while preserving the data via recirculation within each module, reference is made to Table I to develop the desired control word as shown in Table VI. Referring now to FIG. 13, the Control Processor 10 configures three functional planes at $t_2$, $t_3$, and $t_4$, respectively. As previously explained, as the Address Decoder 50 of each Interface Circuit 49 is addressed, a latch enable signal is generated that, in turn, causes its corresponding Configuration Latch 52 to latch-in a control word. This may be referred to as a configuration cycle. Once the configuration cycles for the functional planes that are to be active during the level shift are executed, the remaining functional planes within the Array Processor 61 being left unconfigured and therefore inactive, the Control Processor 10 issues, at $t_5$, the clock down-count number to the Clock Counter and Gate 16. The down-count number is latched into the Clock Counter and Gate 16 by the clock count enable signal at $t_6$. This signal also initiates the down-count sequence to provide the preselected number of clock pulses, as specified by the down-count number, onto the CK line 38. In response to each of these clock pulses, the active functional planes either transmit or receive, depending on their configuration, a single data bit via their Data Exchange Subsystems. Thus, as is shown in FIG. 13, an entire image consisting of data words 16 bits in length can be level shifted between functional planes by the provision of a clock down-count number equal to 16. At $t_7$, the down-count sequence ends and the Clock Counter and Gate 16 generates and provides a clock count complete signal to the Computer System 12, thus indicating that the level shift operation is complete.

TABLE VI

| CONTROL WORD | BIT FUNCTION |
|---|---|
| (MSB) 0000 0000 0010 1000 (LSB) | (1) Input disabled<br>(2) Output Enabled<br>(3) Polarity non-inverted<br>(4) Clock Enabled<br>(5) LSB selected<br>(6) Recirculation enabled<br>(7-10) Nearest Neighbor Data In disabled<br>(11-16) Unused |

B. Lateral Shift

Another basic operation of the Array Processor 61 is the array lateral shift. Though it is a basic operation, it is limited only to those functional planes provided with nearest neighbor serial data transfer capabilities, such as the memory and I/O Functional Planes. During the lateral shift operation, the image present in one of these functional planes is laterally shifted in any one of the four orthogonal directions within its functional plane without loss of the image's spatial integrity. The image's integrity is preserved by virtue of the wrap-around nearest neighbor interconnections between the modules located on the north and south and the east and west edges of the N×N module array. This allows data figuratively shifted over the edge of the array to reappear at its corresponding opposite edge. Further, since images are each present in a different functional plane, any number of images can be laterally shifted in totally independent directions simultaneously.

Figure 14:
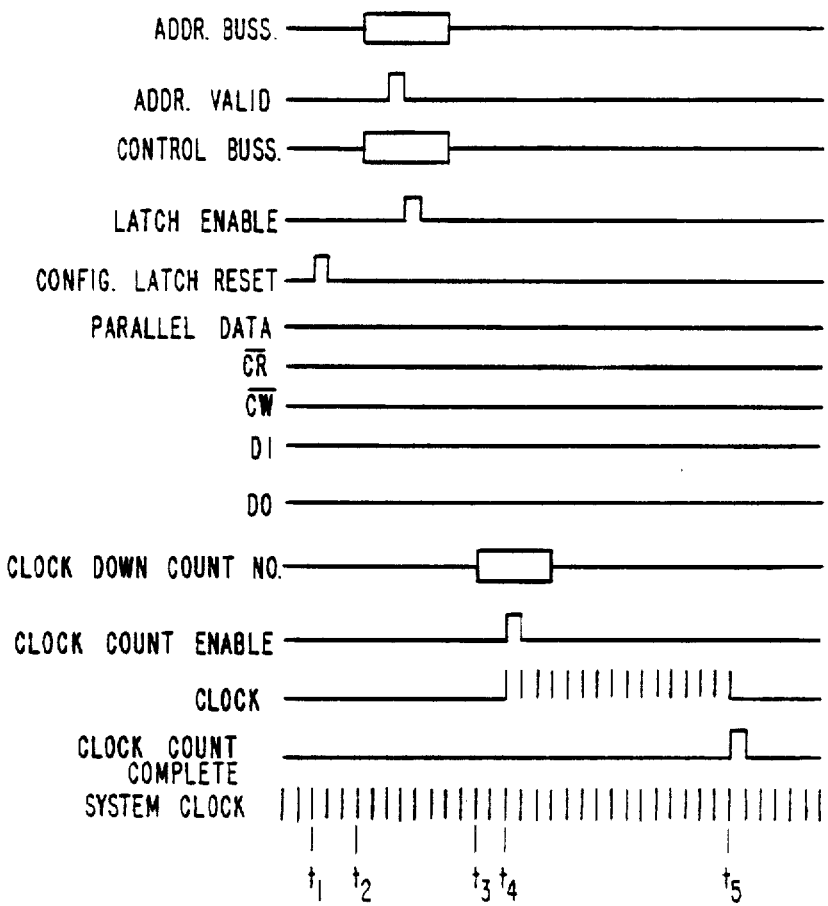
FIG. 14 is a schematic timing diagram for explaining the data lateral shift operation of the Memory Functional Plane of FIG. 7.

The state timing diagram of FIG. 14 shows the particular steps necessary to perform a lateral shift operation. As in the level shift operation, the lateral shift begins with the Control Processor 10 issuing a control latch reset signal at $t_1$. The Control Processor 10, at $t_2$, then configures one or more of the functional planes to perform lateral shift operations, only one such configuration cycle being shown in FIG. 14. As an example, the control word necessary to configure a Memory Functional Plane to perform a lateral shift operation is provided in Table VII. This control word configures the Memory Functional Plane to perform an east lateral shift of the image contained in the functional plane. At $t_3$, again similar to the level shift operation, the Control Processor 10 issues the clock down-count number to the Clock Counter and Gate 16. The clock Down-Count Enable signal, issued at $t_4$, latches in the down-count number and initiates the down-count sequence which provides the preselected number of clock pulses on the CK line 38. In response, the data words are serially shifted out of the modules 102 and into their respective east nearest neighboring modules 102. At the conclusion of the down-count at $t_5$, the Clock Counter and Gate 16 generates and provides a clock count complete signal to the Computer System 12, indicating the completion of the lateral shift operation.

| CONTROL WORD | BIT FUNCTION |
|---|---|
| (MSB) 0000 0000 1000 1010 (LSB) | (1) Input disabled |
| | (2) Output disabled |
| | (3) Polarity non-inverted |
| | (4) Clock Enabled |
| | (5) LSB selected |
| | (6) Recirculation disabled |
| | (7) North Data In disabled |
| | (8) East Data In enabled |
| | (9) South Data In disabled |
| | (10) West Data In disabled |
| | (11-16) Unused |

C. Data I/O

The previous two basic operations generally deal with the movement, or translation, of images within the Array Processor 61. The Data I/O Operation, however, provides for the serial transfer of entire images between the Computer System 12 of the Control Processor 10 and an I/O Functional Plane 152 of the Array Processor 61.

Figure 15:
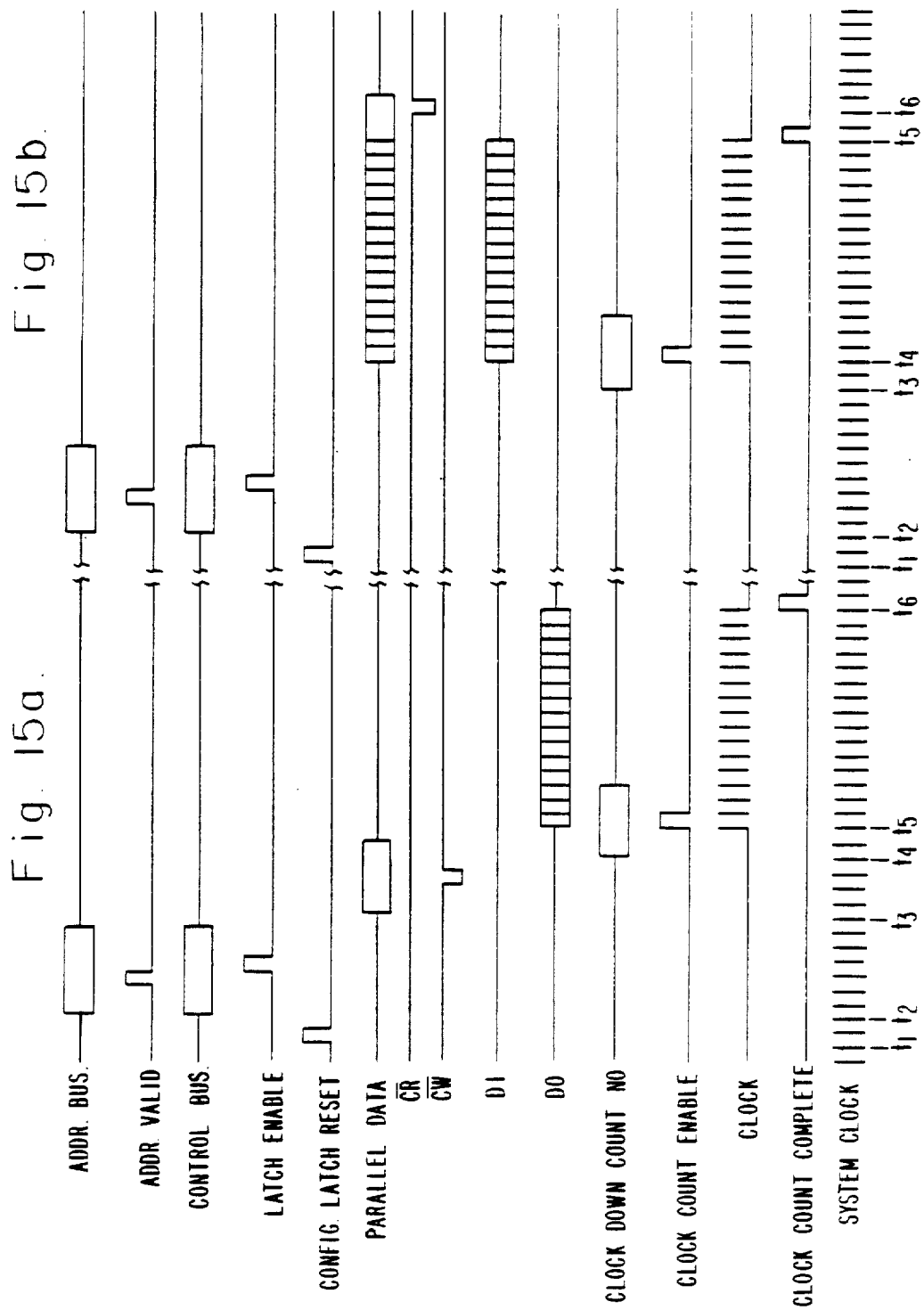
FIGS. 15a and b are schematic timing diagrams for explaining the serial input/output data exchange operation of the I/O Functional Plane shown in FIG. 8.

The Data I/O Operation can be divided, for purposes of discussion, into Image Data Out and Image Data In suboperations. The system timing diagrams showing the principal portions of these operations are shown in FIGS. 15a-b, respectively. In the image data out operation, an image is transferred from the Control Processor 10 to the Array Processor 61. This transfer is accomplished through the use of a two-step procedure. Referring now to FIG. 15a, the first step begins at $t_1$ with all of the Configuration Latches 52 of the Processor Interface 63 being reset to their respective inactive states. At $t_2$, the Control Processor 10 executes a configuration cycle to configure an I/O Functional Plane 152 for a data input, lateral shift east operation. The necessary control word is essentially identical to that necessary to perform a Memory Functional Plane lateral shift east operation, as described in Section III(B), the only exception being that the EXIO bit (bit 11) is set to a logical 1 to enable the operation of the I/O input Data Receiver/Selector 154 and the I/O output Data Transmitter Circuit 155. Next, at $t_3$, the Computer System 12 provides the Converter 18 with the first data word of the image data set. As soon as it is stable on the bidirectional Data Bus 40, it is latched into the Converter 18 by a negative logic converter write signal on the $\overline{CW}$ control line 44. The Computer System 12 then issues, at $t_4$, a clock down-count number to the Clock Counter and Gate 16, the number being preferably equal to the bit length of both the data word and the memory registers 118 of the I/O Functional Plane 152. At $t_5$, the Computer System 12 issues the clock count enable signal, thereby latching the down-count number into the Clock Counter and Gate 16 and initiating the down-count sequence. The Converter 18, in response to the clock pulses, serially transmits the image data word onto the DO line 48. The image data word is synchronously received and serially shifted into the Memory Register 118 of the Memory Module $102_{1,1}$ of the I/O Functional Plane 152. The down-count sequence concludes at $t_6$ with the entire image data word having been transferred to the corner module $102_{1,1}$ of the top row of the I/O Functional Plane's N×N array of Memory Modules 102.

The portion of the first step of the data output operation beginning at $t_3$ and ending at $t_6$ is then repeated N−1 times. Each time this operation is repeated, a new data word from the image data set is provided to the top row, corner module $102_{1,1}$, with the data words previously present there being successively laterally shifted to their east nearest neighboring modules $102_{1,1}$ to $102_{1,n}$. As should be apparent, an entire row of the I/O Functional Plane 152 is thus provided with a portion of the image.

The second step of the data output operation involves shifting the data contained in the top row of modules 102 south by one row. This can be accomplished by executing an image lateral shift south on the I/O Functional Plane 152. The lateral shift south is strictly analogous to the lateral shift east operation, with bit 9 being set instead of bit 8.

These two steps are successively repeated until the entire image data set has been transferred from the Control Processor 10 to the I/O Functional Plane 152 of the Array Processor 61. During the operation therefore, the flow of data words is west to east and north to south, with the initial data word ultimately being stored in the bottom row, corner module $102_{n,n}$ and the final data word being stored in the top row, corner module $102_{1,1}$. This orderly flow of data permits the image to be simply and efficiently mapped into the memory registers 118 of an I/O Functional Plane 152.

The data input operation, which transfers an image from the Array Processor 61 to the Computer System 12, is substantially analogous to the data output operation Referring to FIG. 15b, at $t_1$, the Configuration Latches 52 of the Processor Interface 63 are reset and, at $t_2$, the Control Processor 10 executes a configuration cycle to configure an I/O Functional Plane 152 for the data input operation. This configuration is the same as used in the data output operation previously described, the EXIO signal enabling the data transmitter 155 as well as the Data Receiver/Selector 154. At t₃, however, the Computer System 12 issues the clock down-count number and, at t₄, initiates the down-count sequence by issuing the clock Down-Count Enable signal. In response to the CK pulses, data from the Memory Register 118 of the bottom row, corner module $102_{n,n}$, as present on its Nearest Neighbor Data Output line 160, is transmitted via the Data Transmitter Circuit 155 onto the DI line 46. The serial data so derived is synchronously clocked into the Converter 18. At the end of the down-count sequence, at t₅, the data word previously present in the bottom row, corner module $102_{n,n}$ has been transferred to the Converter 18. Thus, after the Computer System 12 receives the Clock Down-count Complete signal at t₅, it issues the negative logic converter read signal, at t₆, on the $\overline{CR}$ control line 42 and reads the parallel converted data word present in the Converter 18. The sequence of events beginning with t₃ and ending with t₆ is then repeated N−1 times, thereby transferring all of the data words from the bottom row of modules 102 in the I/O Functional Plane 152 to the Computer System 12. Thus, in order to transfer an entire image from the Array Processor 61 to the Computer System 12, the above step is repeated in succession with a lateral shift south operation until the data initially present in the top row of modules has been shifted to the bottom row of modules and further shifted laterally through the bottom row, corner module $102_{n,n}$.

The image data out and image date in suboperations have been described separately for purposes of discussion only. They may be performed separately or simultaneously with the use of a concurrently operating serial-in, serial-out Converter 18. For simultaneous image exchange, the data in and data out suboperations are overlapped, so that prior to each down-count sequence, a data word is written into the Converter 18 and, subsequent to the down-count sequence, a data word is read from the Converter 18. Thus, during the down-count sequence, a data word from the Array Processor 61 is serially shifted into the Converter 18 to replace the data word that is simultaneously being shifted to the Array Processor 61. Considering the identical shifting sequences of the suboperations, it is apparent that the data words so exchanged are read from and written to the same relative location within their respective image data sets. Consequently, entire image data sets, or respective portions thereof, may be simply exchanged between the Control Processor 10 and the Array Processor 61.

It should also be understood from the discussion of the I/O Data Exchange Subsystem in Section II, supra, that any number of image data sets may be transferred simultaneously from an equal number of I/O Functional Planes 152 present in the Array Processor 61 to the Control Processor 10. To do so, the I/O Functional Planes 152 need only be commonly configured to transmit their respective data onto the DI bus line 46. Thus, during the down-count sequence, the AND of the corresponding data words from the several image data sets is provided to the Converter 18.

E. Example

The above-described basic operations of the Array Processor 61 can be utilized, in combination with a variety of types of functional planes, to perform practically any image processing algorithm. To illustrate the general operation of the Array Processor 61 executing an algorithm, an example is provided below.

UNSIGNED MULTIPLY EXAMPLE

The following "program" provides for the unsigned multiplication of one image data set by another. The multiplicand image data set is provided in one Memory Functional Plane (MEM 1) while the multiplier is in a second Memory Functional Plane (MEM 2). The data words present in the positionally corresponding modules of the Memory Functional Planes will be multiplied, with the interim, and ultimately the final, product being present in the similarly corresponding modules of an Accumulator Functional Plane (ACC 1).

The multiplication algorithm that is implemented by the "program" uses the simple "shift and add" technique. As will be seen, the multiplier data words are shifted by one bit between each serial addition. While not essential to the example, a counter of functional plane (CNT 1) is provided to develop the bit sum of the multiplier data words in each of its positionally corresponding modules to illustrate its operation.

The multiplicand and multiplier data sets may be considered to be ancillary data sets to one another. The multiplication product and the counter bit sum data sets may be considered image derivative data sets.

For purposes of the example, the data words are given as 4 bits in length and the module memory registers are given as 8 bits in length. The data words are present in the lower 4 bit positions of their respective memory registers while the high 4 bit positions are 0.

| | | PROGRAM | |
|---|---|---|---|
| Line No. | Functional Plane Addressed | Corresponding Configuration Bus Lines Set Active | Control Processor Operation Performed |
| 1 | ACC 1 | ADD, CLK | Configuration Cycle |
| 2 | CNT 1 | R | Configuration Cycle |
| 3 | | | issue 8 CK pulses |
| 4 | | | reset configuration latches |
| 5 | MEM 1 | REC, $\overline{O}$, CLK | Configuration Cycle |
| 6 | MEM 2 | O | Configuration Cycle |
| 7 | ACC 1 | REC, I, CLK | Configuration Cycle |
| 8 | | | issue 8 CK pulses |
| 9 | | | reset configuration latches |
| 10 | MEM 1 | REC, CLK | Configuration Cycle |
| 11 | | | issue 7 CK pulses |
| 12 | | | reset configuration latches |
| 13 | MEM 2 | REC, CLK, $\overline{O}$ | Configuration Cycle |
| 14 | CNT 1 | I | Configuration Cycle |
| 15 | CNT 1 | (all inactive) | Configuration Cycle |
| 16 | | | issue 1 CK pulse |
| 17 | | | reset configuration latches |
| 18 | | | Do program lines 5 through 16 until they have been performed 4 times. |
| 19 | CNT 1 | SET | Configuration Cycle |
| 20 | | | reset configuration latches |

| Line Ref. No. | Comments |
|---|---|
| 1–4 | the ACC 1 data words are cleared and the modules are set for addition, and the CNT 1 counters are reset. |

-continued

| Line Ref. No. | Comments |
|---|---|
| 5-9 | the bits of the multiplicand data words are successively ANDed with the present LSB's of the multiplier data words by means of the Data Exchange Subsystem and added to the previous accumulator data words, respectively. This conditional, or data dependent, addition effectively multiplies the multiplicands by the LSB of the multipliers. |
| 10-12 | the multiplicand data words are shifted left by one bit to adjust the decimal point for the next multiplication, the one bit shift left being accomplished by a 7 bit shift right. |
| 13-17 | the multiplier data words are shifted right by one bit so that the multiplicands are effectively multiplied by the next greater significant bit of the multiplier data words; the multiplier bits shifted are bit summed by the respective counters. |
| 18 | lines 5 through 17 are performed once for each significant bit of the multiplier data words, or a total of 4 times in the present example, so that the accumulator data words are the product of the respective multiplicand and multiplier data words. |
| 19-20 | the bit counts of the multiplier data words are latched into their respective counter module memory registers. |

Considering a single Elemental Processor having the following initial data words in its indicated modules, the above program would develop the following final product.

| Program Point | MEM 1 | MEM 2 | ACC 1 | CNT 1 |
|---|---|---|---|---|
| Initial | 00001110 | 00000101 | Don't care | (Don't care)* |
| Line 4 | 00001110 | 00000101 | 00000000 | (00000) |
| Line 17, loop 1 | 00011100 | 10000010 | 00001110 | (00001) |
| Line 17, loop 2 | 00111000 | 01000001 | 00001110 | (00001) |
| Line 17, loop 3 | 01110000 | 10100000 | 01000110 | (00010) |
| Line 17, loop 4 | 11100000 | 01010000 | 01000110 | (00010) |
| Line 19 | 11100000 | 01010000 | 01000110 | 00010 |

*The numbers in ( )'s being at the outputs of the counter circuit.

IV. Detailed Description of the Present Invention

A. Column Shorted and Full Array Shorted Functional Plane

Figure 16:
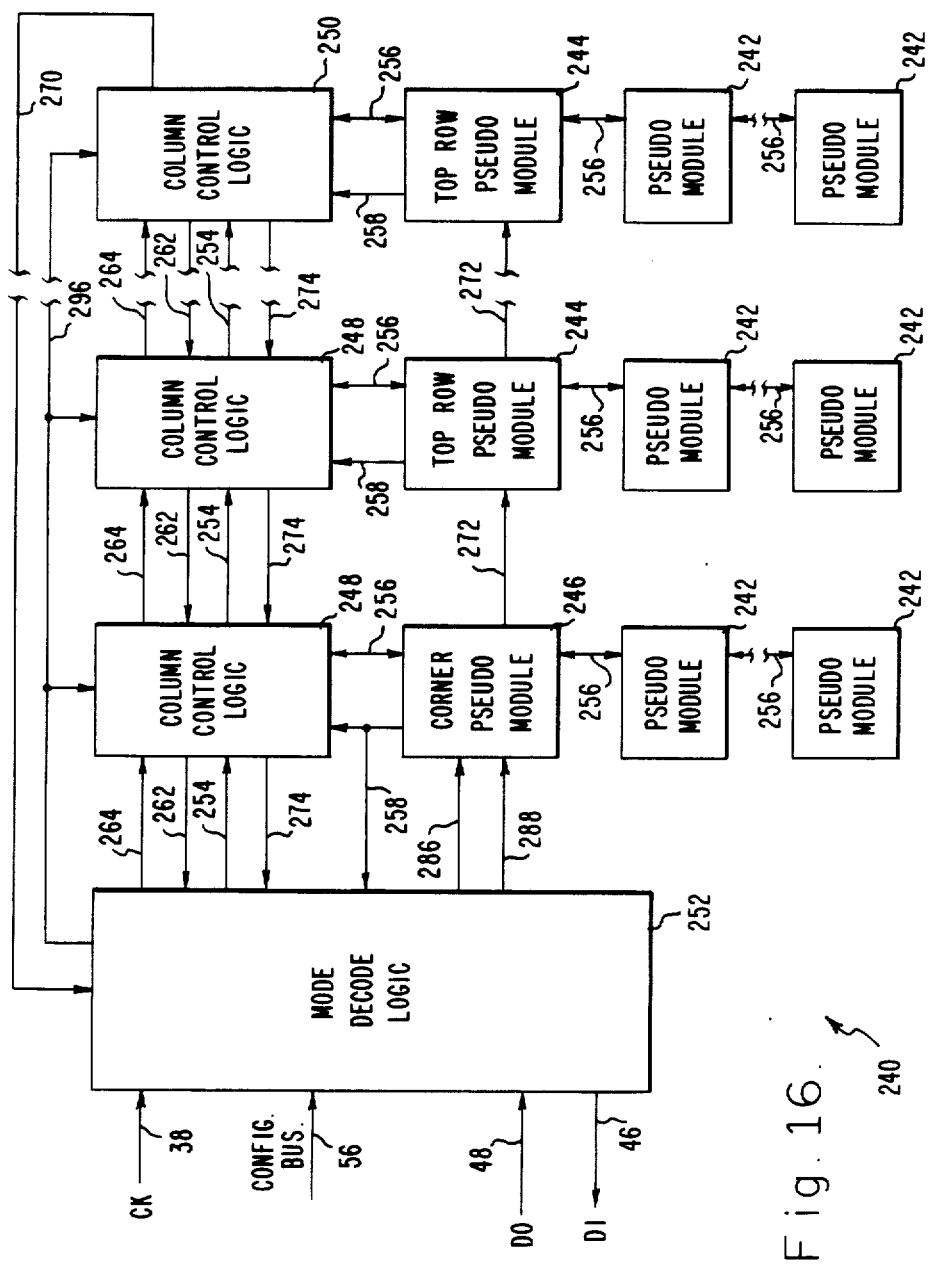
FIG. 16 is a schematic block diagram of a column shorted and full array Shorted Functional Plane according to the present invention.

The present invention provides for a Column Shorted and Full Array Shorted Functional Plane 240, substantially shown in FIG. 16, that permits a number of unique and fairly specialized data and image transfers to be performed within the Array Processor 61 and between the Array Processor 61 and the Control Processor 10.

Referring now to FIG. 16, a Column Shorted and Full Array Shorted Functional Plane 240 includes a Mode Decoder 252, a number of Column Controllers 248-250, and an array of Pseudo-Modules 242, 244, 246. A standard Interface Circuit 49, shown in FIG. 3, is also included in the Shorted Plane 240 in order to interconnect the Control Processor 10 with the Shorted Plane Mode Decoder 252. Table VIII provides a listing and functional description of those bits of the Configuration Latch 52 of the Interface Circuit 49 that have an assigned function with respect to the Shorted Plane 240.

Figure 22:
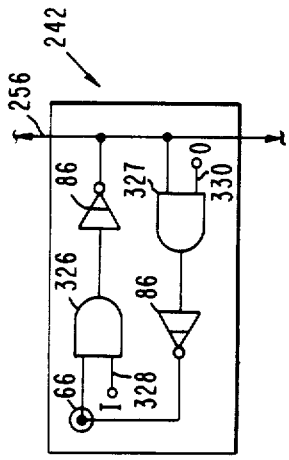
FIG. 22 is a schematic circuit diagram of a Standard Pseudo-Module of the Shorted Functional Plane Pseudomodule Array.
Figure 21:
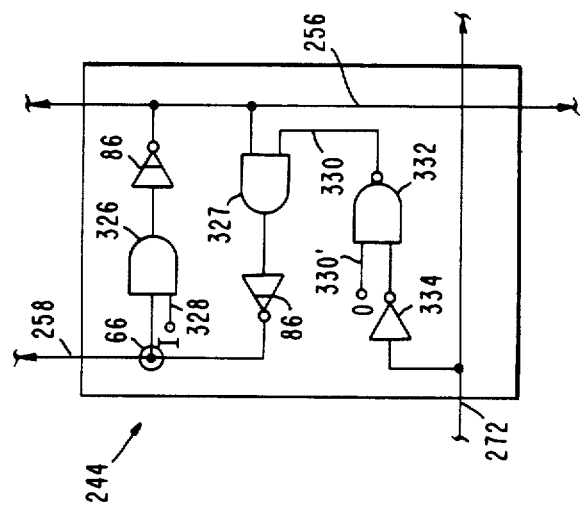
FIG. 21 is a schematic circuit diagram of the Top Row Pseudomodule of the Shorted Functional Plane Pseudo-Module Array.

The array of Pseudo-Modules 242, 244, 246 of a Shorted Plane 240 corresponds to the module arrays of the various functional planes present within the Array Processor 61. There are a number of different specific types of pseudo-modules that comprise the pseudo-module array. They include the Corner Pseudo-Module 246 (FIG. 20), the Top Row Pseudo-Module 244 (FIG. 21), and the Standard Pseudo-Module 242 (FIG. 22). The pseudo-module array is architecturally organized as a number of columns, the pseudo-modules located within the top row of the pseudo-module array generally being Top Row Pseudo-Modules 244. An exception to this is that a pseudo-module present in the top row of a column located at one edge of the array is a Corner Pseudo-Module 246. The pseudo-modules of each column are interconnected by a Column Data Bus 256. The Column Data Bus 256 is part of a column data exchange subsystem that is functionally similar to the Elemental Processor Data Exchange Subsystem 74, shown in FIG. 5a.

TABLE VIII

Configuration Bus Inputs for Column Shorted and Full Array Shorted Functional Plane

| Bit | Mnemonic | Name | Active State | Function |
|---|---|---|---|---|
| 1 | I | Input | High | Enables data input through the data exchange subsystem. |
| 2 | O | Output | High | Enables data output through the data exchange subsystem. |
| 3 | CLK | Clock Enable | High | Enables application of CK pulses to the shift register. |
| 4 | MSB | Most Significant Bit | High | Enables the transfer of the most significant bit of data from the column memory register to the memory register of the neighboring column. |
| 5 | LSB | Least Significant Bit | High | Enables the transfer of data through the LSB position of the memory register to the memory register of the neighboring column. |
| 6 | OUT | Column Data Out | High | Enables the transfer of the OR of the data bits provided by a column's pseudo-modules to the memory register of the neighboring column. |
| 7 | MS | Mode Select | High | Selects the column shorted mode of operation. |
|   |   |   | Low | Selects the full array shorted mode of operation. |
| 8 | DOE | Data Out Enable | High | Enables the transfer of serial line data to the functional plane via the DO line. |

TABLE VIII-continued

Configuration Bus Inputs for
Column Shorted and Full Array Shorted
Functional Plane

| Bit | Mnemonic | Name | Active State | Function |
| --- | --- | --- | --- | --- |
| 9 | ADE | Array Data Enable | High | Selects for the transfer of data both to and from the pseudo-modules, the data being transferred from either the corner or top row pseudo-modules to the remainder of those in the full array or the columns, respectively, depending on the mode selected. |
|  |  |  | Low | Selects for the transfer of data to be either to or from the pseudo-modules, the source of data being either the DO line or the column memory registers with the destination of data being either the DI line or the column memory registers, depending on the OUT signal and the MS signal. |
| 10 | ADI | Array Data In Enable | High | Enables the transmission of data onto the DI line from either the last column's memory register or the pseudo-modules of the full array, the data being ANDed together, depending on the out signal and the MS signal. |
| | | Additional Inputs and Outputs | | |
|  | CK | Clock | Pulse | Shifts the data in the memory register one position to the right; edge sensitive, low when inactive. |
|  | DI | Data In | N/A | Unidirectional serial data bus for transfering data from the array processor to the control processor. |
|  | DO | Data Out | N/A | Unidirectional serial data bus for the transfer of data from the control processor to the array processor. |

Figure 17:
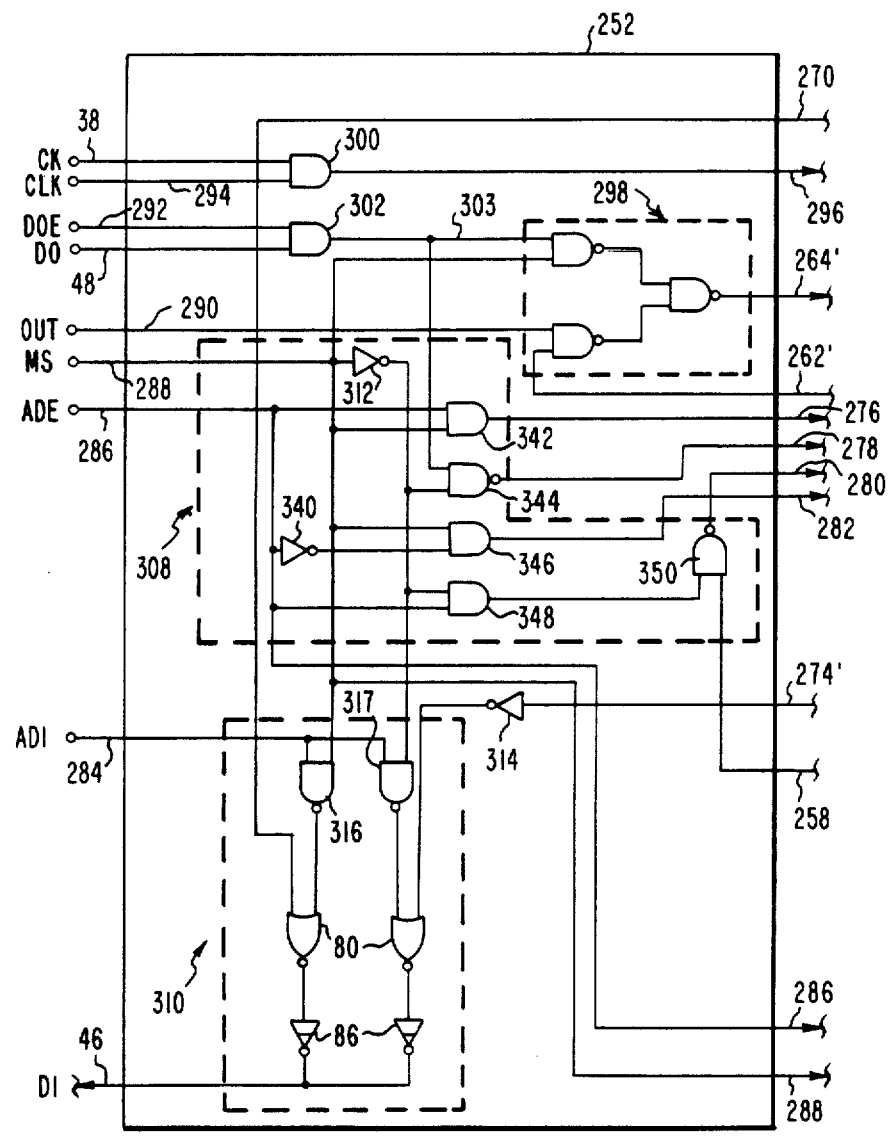
FIG. 17 is a schematic circuit diagram of the Mode Decode Logic Block of the Shorted Functional Plane shown in FIG. 16.
Figure 18:
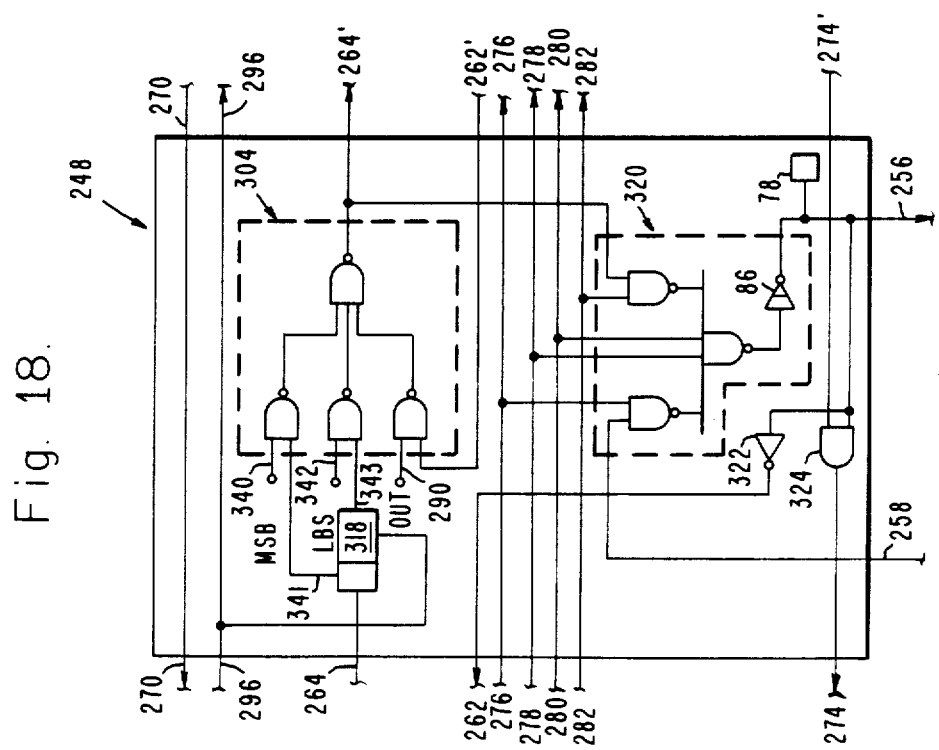
FIG. 18 is a schematic circuit diagram of the Column Control Logic Block of the Shorted Functional Plane shown in FIG. 16.

Associated with the pseudo-module columns are a number of Column Controllers 248, 250. A standard Column Controller 248, shown in FIG. 18, is associated with each column of the pseudo-module array with the exception of an edge column that is associated with an End Column Controller 250, shown in FIG. 19. The Column Controllers 248, 250 are interconnected with their pseudo-module columns by the Column Data Busses 256 of their respective column data exchange subsystems. They also obtain data from their respective Corner or Top Row Pseudo-Modules 246, 244 by means of the top row data lines 258. The Column Controllers 248, 250 are also interconnected to one another by means of a number of data and control lines 254 (which includes lines 276, 278, 280, 282 shown in FIGS. 17, 18, and 19), 262, 264, 274.

The Corner and Top Row Pseudo-Modules 246, 244 of the pseudo-module array and the Column Controllers 248, 250 are also interconnected with the Mode Decoder 252 by the control and data lines 254, 262, 264, 274, the top row data line 258 of the Corner Pseudo-module 246, and the top row mode select and array data enable lines 266, 268. The Mode Decoder 252 is provided to decode the control word, as provided by the Control Processor 10 via an Interface Circuit 49 and the Configuration Bus 56, and thereby establish the corresponding operating configuration of the Shorted Functional Plane 240. The System Clock (CK) Line 38, along with the DO 48 and DI 46 lines, also interconnect the Control Processor 10 and the Mode Decoder 252. The various constituent parts of the Shorted Functional Plane 240 and the operating configuration thereof will be described in greater detail in Sections IV B-F, infra.

B. Pseudo-Module Array

The Standard, Top Row, and Corner Pseudo-modules 242, 244, 246, are similar to one another in that each has an associated Array Processor Data Bus Line 66, a Column Data Bus 256, and a pair of data transmitters that are substantially identical to those used in the Elemental Processor Data Exchange Subsystem 74 of FIG. 5a. The data transmitters are most clearly shown in the Standard Pseudo-Module 242 of FIG. 22. The data transmitters are connected in parallel, though with opposite orientations, between the Elemental Processor Data Bus 66 and the Column Data Bus 256. The first data transmitter consists of an AND Gate 326 and an Inverting Open Collector Output Buffer 86. It operates to receive data from the Elemental Processor Data Bus 66, invert it, and then transmit it onto the Column Data Bus 256 when the AND Gate 326 is enabled by the application of the Input signal on the I programmable input 328. The Column Data Busses 256 thus collectively AND the inverted data provided by the first data transmitters of their associated pseudo-modules. As will be seen, this column data is subsequently inverted so as to provide the OR of the collective data received by the first data transmitter. The second data transmitter is also comprised of an AND Gate 327 and an Inverting Open Collector Output Buffer 86 to perform a complementary function. It receives data from the Column Data Bus 256, inverts it, and drives it onto the Elemental Processor Data Bus 66 when the AND Gate 327 is enabled by the Output signal on the O programmable input 330 as provided for by the Control Processor 10 on the Configuration Bus 56. The transmitted data, however, is not effectively inverted since it is also inverted prior to being provided to the pseudo-modules on the Column Data Busses 256.

These Standard Pseudo-Modules 242 comprise the majority of the pseudo-module array. Naturally, the Column Data Busses 256 associated with the Standard Pseudo-Modules 242 that are present in the last row of the pseudo-module array would terminate after connecting with the output of the Open Collector Buffer 86 of the first data transmitter and to the data input of the AND Gate 327 of the second data transmitter.

The Top Row Pseudo-Modules 244 are essentially identical to the Standard Pseudo-Modules 242. They differ therefrom, however, in that they include additional circuitry for disabling the transmission of data by the second data transmitter. This additional cicuitry includes an Inverter 334 and a NAND Gate 332. The Output signal is applied to the O programmable input line 330' of the NAND Gate 332 while the Top Row Output Disable signal, as generated by the Corner Pseudo-Module 246 and provided on the top row output disable line 272 (active high), is inverted by the Inverter 334 and provided to the NAND Gate 332 on its input line 330. Thus, when the Top Row Output Disable signal is inactive, the operation of the second data transmitter is exclusively controlled by the Output signal in strict analogy with the operation of the Standard Pseudo-Module 242. However, when the Top Row Output Disable signal is active, the operation of the second data transmitter is disabled irrespective of the state of the Output signal. Since this Top Row Output Disable signal is provided to each of the Top Row Pseudo-Modules 244 of the pseudo-module array, and effectively recognized by the additional circuitry within the Corner Pseudo-Module 246 as explained below, the transmission of data to the respective Elemental Processor Data Exchange Subsystems 74 associated with the top row of pseudo-modules is effectively defeated. This allows data to be input from the top row Elemental Processor Data Exchange Subsystems 74 to their respective Column Controllers 248, 250 via the top row data lines 258 while data is output by way of the column data exchange subsystems to the Elemental Processor Data Exchange Subsystems 74 associated with the Standard Pseudo-Modules 242.

Figure 20:
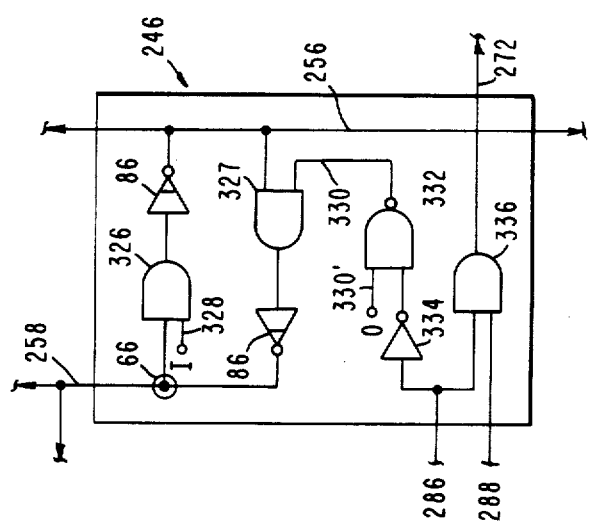
FIG. 20 is a schematic circuit diagram of the Corner Pseudomodule of the Shorted Functional Plane pseudomodule array.

Referring now to the Corner Pseudo-Module 246 shown in FIG. 20, the additional circuitry contained therein includes an AND Gate 336, along with the Inverter 334 and the NAND Gate 332 that are also present in the Top Row Pseudo-Modules 244. The Array Data Enable signal, as provided by the Control Processor 10 by way of the Configuration Bus 56, is applied to the Inverter 334 on the ADE programmable input line 286. This signal, when active high, completely disables the transmission of data by the second data transmitter just as the Top Row Output Disable signal, when active high, disables the second data transmitter of the Top Row Pseudo-Modules 244. The Array Data Enable signal, along with the Mode Select signal as provided on the MS programmable input line 288, are applied to the AND Gate 336 to generate the Top Row Output Disable signal. The state of the Mode Select signal determines whether the Array Data Enable signal is gated onto the top row output disable line 272 and therefrom to all of the Top Row Pseudo-Modules as the Top Row Output Disable Signal. Thus, when the Mode Select signal is active low, the Top Row Output Disable signal is maintained inactive regardless of the state of the Array Data Enable signal. Under these circumstances, when the Array Data Enable signal is active high, only the second data transmitter of the Corner Pseudo-Module 246 is disabled. This allows data to be input from the corner Elemental Processor Data Bus 66 to its corresponding Column Controller 248 and the Mode Decoder 252 by way of the top row data line 258 while data is output to the elemental processor data exchange subsystems associated with all of the other pseudo-modules present within the Shorted Plane Pseudo-Module Array.

C. Column Controllers

A separate Column Controller 248, 250 is associated with each column of the pseudo-module array. The Column Controllers 248, 250 are substantially identical to one another. The difference between the Standard Column Controllers 248 and the End Column Controller 250, which is associated with a pseudo-module column present at an edge of the pseudo-module array, will become apparent as they are discussed below.

Referring now to FIG. 18, the Standard Column Controller 248 is comprised of three major subunits. They are the column memory register 318, a three-way data selector 304, and a four-way data selector/column data transmitter 320.

Considering now any one of the successively adjacent Standard Column Controllers 248, serial data is input through the most significant bit position of the memory register 318 from the preceedingly adjacent Standard Column Controller 248 by way of the memory register data transfer line 264. The data is serially clocked into the register in response to a series of clock pulses provided on the internal clock line 296. Data is provided from the memory register 318 to the three-way data selector 304 from either its most significant bit or least significant bit position, via the memory register data output lines 341, 343, respectively, as selected by the state of the Most Significant Bit and Least Significant Bit signals provided on the corresponding MSB and LSB programmable input lines 340, 342. A third source of data to the three-way data selector 304 is the Column Data Exchange Subsystem Data Bus 256 of the succeedingly adjacent Column Controller 248. In each of the Column Controllers 248, 250, an inverter 322 is provided to buffer data from its corresponding Column Data Bus 256 to the preceedingly adjacent Column Controller 248 on the ORed column data line 262. Thus, column data is received by the three-way data selector 304 on the ORed column data line 262' (the ORed column data line 262 of the succeedingly adjacent Column Controller 248, 250) and, when enabled by the Out signal as provided on the OUT programmable input line 290, is returned to the succeedingly adjacent Column Controller 248, 250 on the memory register data transfer line 264'. This effectively allows the ORed data collected by the column data exchange subsystem and the inverter 322 to be transferred to its corresponding column memory register 318, thereby enabling the acquisition of an indication of the nature of the data present within a particular column of elemental processors within the Array Processor 61.

Data from the three-way data selector 304 is also provided within the Column Controller 248 to the four-way data selector/transmitter 320. This data is driven onto the Column Data Exchange Subsystem Data Bus 256 when the four-way data selector/transmitter 320 receives a Memory Register Data Return signal as generated by the Mode Decoder 252 and provided on the memory register data return line 282. The data output by the four-way data selector/transmitter 320 is driven onto the Data Bus 256 through an Inverting Open Collector Output Buffer 86. With the provision of a resistive load 78, it should be clear that the four-way data selector/transmitter 320 is functionally equivalent to any of the data transmitters associated with its respective Column Data Exchange Subsystem Data Bus 256.

The four-way data selector/transmitter 320 also receives data from the Elemental Processor Data Bus 66 of its corresponding Corner or Top Row Pseudo-Module 246, 244 via the top row data line 258. The transfer of this data to the Column Data Bus 256 is enabled by a Top Row Data Return Enable signal as generated by the mode decoder 252 and provided on the top row data return enable line 276. Similarly, data is provided to the four-way data selector/transmitters 320 of all of the Column Controllers 248, 250 from the Elemental Processor Data Bus 66 of the Corner Pseudo-Module 246 on the corner data return line 280 and from the Control Processor 10 on the array data input line 278. These last two sources of data provide data in the alternative. That is, when either is inactive, it acts as the enabling signal for the other, thereby allowing the active data source to be buffered onto the respective Column Data Busses 256.

Each Standard Column Controller 248 also includes an AND gate 324 that is used in acquiring ORed data from the entire array of Elemental Processors 60. This is accomplished by using the AND gate 324 to combine data provided on the ORed array data line 274' of the succeedingly adjacent Column Controller 248, 250 with data from its corresponding column data bus 256. This data is then provided to the preceedingly adjacent Standard Column Controller 248 on the ORed array data line 274. This results in data from each of the Column Data Busses 256 being successively combined to ultimately provide an indication of the nature of the data contained in the Array Processor 61.

Figure 19:
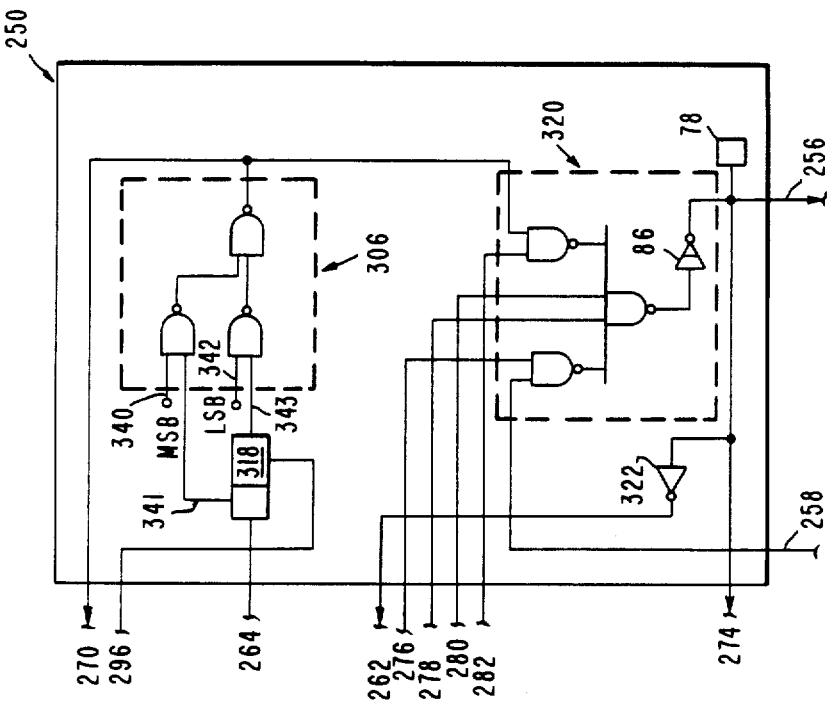
FIG. 19 is a schematic circuit diagram of the end Column Control Logic Block of the Shorted Functional Plane shown in FIG. 16.

Referring now to FIG. 19, the End Column Controller 250 is substantially identical to the Standard Column Controllers 248. The differences between the two types of column controllers stem from the fact that the End Column Controller 250 has no succeedingly adjacent column controller. Thus, only a two-way data selector 306 is needed to select data from its associated memory register 318. The data output from the two-way data selector 306 is provided to the Mode Decoder 252 via an end column data return line 270. Also, the need for the logical AND gate 324 is obviated, the data from its associated Column Data Bus 256 being provided directly to the preceedingly adjacent Standard Column Controller 248 on the ORed array data line 274.

D. Mode Decoder

The Mode Decoder 252 acts as an interface between the Column Controllers 248, 250 and Corner Pseudo-Module 246 and the configuration latch 52 of the Shorted Planes Interface Circuit 49. Table VIII provides a listing and functional description of the signals present at the Interface Circuit 49/Mode Decoder 252 interface. The state of these signals can be preferentially established by the Control Processor 10 when it executes an appropriate configuration cycle as described in Section III, A, supra.

The interface betwen the Mode Decoder 252 and the Column Controllers 248, 250 is such that the Mode Decoder 252 appears simply as a preceedingly adjacent column controller. An AND gate 300 is used to selectively gate system clock pulses from the CK line 38 onto the internal clock line 296 when the Clock Enable signal is present on the CLK programmable input line 294. The Mode Decoder 252 also includes a two-way data selector 298 to provide serial data to the first of the Standard Column Controllers 248 on the memory register data transfer line 264'. The data may be initially received from the array processor DO line 48 and gated onto one of the two-way data selector's input lines 303 by the AND gate 302 when the Data Out Enable signal is provided on the DOE programmable input line 292. The transfer of this data to the output of the two-way data selector 298 must be further enabled by the presence of the Mode Select signal on the MS programmable input line 288. Data is also supplied to the two-way data selector 298 from the ORed column data line 262' from the first successively adjacent Standard Column Controller 248. This ORed column data is transferred to the output of the two-way data selector 298 when the Out signal is present on the OUT programmable input line 290.

The decoder block 308 decodes the Mode Select and Array Data Enable signals and obtains data from the two-way data selector input line 303 and the top row data line 258 from the Corner Pseudo-Module 246 to thereby generate the Top Row Data Return Enable and the Memory Register Data Return Enable signals. It also provides for the return of the data from the Elemental Processor Data Bus 66 of the Corner Pseudo-Module 246 and the transfer of data from the Control Processor 10 to the corner data return and array data input lines 280, 276, respectively. The AND gate 342 combines the Mode Select and the Array Data Enable signals to generate the Top Row Data Return Enable signal on line 276. The NAND gate 344 transfers serial data from the two-way data selector input line 303 to the serial data line/corner data return enable line 278 when enabled by the Mode Select signal as inverted by the inverter 312. The AND gate 346 provides the Memory Register Data Return Enable signal on line 282 by combining the Array Data Enable signal, as inverted by the inverter 340, and the Mode Select signal. Finally, data from the Corner Pseudo-Module 246, as present on its top row data line 258, is gated by the NAND gate 350 onto the corner data return line/serial data enable line 280. This data transfer is itself enabled by the AND gate 348 which generates an enabling signal by combining the Mode Select signal, as inverted by the inverter 312, and the Array Data Enable signal.

The Mode Decoder 252 also includes a dual data transmitter block 310 to provide serial data to the Control Processor 10 via the DI line 46. Data is received by the dual data transmitter block 310 on the end column data return line 270 and the ORed array data line 274', as inverted by the inverter 314. The transmitters are of the standard data transmitter configuration, each including a NOR gate 80 and an open collector output buffer 86. A NAND gate 316 is provided to enable the transfer of data from the end column data return line 270 to the DI line 46, the enabling signal being generated from the combination of the Mode Select signal and the Array Data Input Enable signal, as provided on the ADI programmable input line 284. Similarly, the NAND gate 317 combines the Mode Select signal, as inverted by the inverter 312, and the Array Data Input Enable signal to enable the transfer of the ORed array data, as inverted by the inverter 314, to the DI line 46.

Finally, the Mode Decoder 252 interfaces with the Corner Pseudo-Module 246 by providing it with the Mode Select and Array Data Enable signals as present on the MS and ADE programmable input lines 288, 286, respectively.

E. Operational Modes

The Shorted Functional Plane 240 can be operated in any number of unique operational modes to manipulate and transfer data or image data sets within the Array Processor 61 and between the Control Processor 10 and the Array Processor 61. There are, however, essentially eight basic shorted plane functional modes. These eight basic modes can be categorized as utility modes, shorted plane modes, or ORed data modes. The eight basic modes, along with their category and corresponding control words, are listed in Table IX.

The utility modes provide for the tranfer of data between the Control Processor 10 and the Column Memory Registers 318 of the Column Controllers 248, 250, via the serial data DI 46 and DO 48 lines. Correspondingly, there are two basic utility modes. The first mode provides for the transfer of 'serial data out to the column memory registers'. The data, on the DO line 48, is gated through the AND gate 302, as enabled by the data output enable signal as present on the DOE programmable line 292, and through the two-way data selector 298, as enabled by the mode select signal on the MS programmable input line 288, onto the column memory register data transfer line 264'. This data is synchronously clocked into the successive column memory registers 318 in response to the system clock (CK) signals on line 38 as enabled by the clock enable signal on the CLK programmable input line 294. The data is serially transferred through the column memory register 318 and three-way data selector 304 of each of the Column Controllers 248, 250 until the desired data is present in the respective column memory registers 318.

ters 318 of the Shorted Plane 240. Further, these transfers of data can be optionally chosen either as the single most significant bit or as full data words depending on the state of the Most Significant Bit and Least Significant Bit signals as provided on the MSB and LSB programmable input lines 340, 342, respectively, and the number of system clock (CK) pulses provided to the Shorted Plane 240 during the data transfer.

The shorted plane modes provide for the transfer of data to the various functional planes of the Array Processor 61 via the Elemental Processor Data Exchange Subsystems 74. The first of the four basic shorted plane modes provides for the transfer of data from the Control Processor 10 to all of the Elemental Processor Data Exchange Subsystems 74. This can be referred to as a full array shorted mode. Data provided by the Control Processor 10 on the serial data DO line 48 is transferred to the serial data line/corner data return enable line 275 and therefrom to each of the four-way data selector/transmitters 320 of the Column Controllers 248, 250. The data is then driven onto the respective Column Data Exchange Subsystem Data Busses 256, through the second data transmitters of the Pseudo-Modules 242, 244, 246, and onto their associated Elemental Processor Data Exchange Subsystem Data Busses 66. This allows the Control Processor 10 to create an image data set of common data words within the Array Processor 61 by outputting a single serial data word on the DO line 48 during a standard Array Processor Level Shift Operation, as described in section III, A, supra.

The second of the basic shorted plane modes is a major variant of the full array shorted mode. It provides for the transfer of data obtained from the Elemental Processor Data Exchange Subsystem Data Bus 66 asso-

TABLE IX

Basic Control Words for the Shorted Functional Plane

| Category | Mode | (MSB) ADI | ADE | DOE | MS | OUT | LSB* | MSB* | CLK | O | (LSB) I |
|---|---|---|---|---|---|---|---|---|---|---|---|
| Ultility Modes | Serial Data Out to Column Memory Registers | 0 | 0 | 1 | 1 | 0 | X | X | 1 | 0 | 0 |
|  | Column Memory Register to Serial Data In | 1 | 0 | 0 | 0 | 0 | X | X | 1 | 0 | 0 |
| Shorted Plane Modes | Full Array Shorted | 0 | 0 | 1 | 0 | 0 | 0 | 0 | 0 | 1 | 0 |
|  | Corner to Full Array Shorted | 0 | 1 | 0 | 0 | 0 | 0 | 0 | 0 | 1 | 0 |
|  | Column Shorted | 0 | 0 | 0 | 1 | 0 | X | X | 1 | 1 | 0 |
|  | Top Row to Column Shorted | 0 | 1 | 0 | 1 | 0 | 0 | 0 | 0 | 1 | 0 |
| ORed Data Modes | ORed Data Full Array Shorted | 1 | 0 | 0 | 0 | 0 | 0 | 0 | 0 | 0 | 1 |
|  | ORed Data Column Shorted | 1 | 0 | 0 | 1 | 1 | 0 | 0 | 0 | 0 | 1 |

* Either LSB or MSB can be selected, the number of CK pulses being adjusted accordingly.

The second basic utility mode provides for the transfer of data from the 'column memory registers to the serial data in' line. In this mode, the respective column memory register data is synchronously clocked through the successive column memory registers 318 and their associated three-way data selectors 304. The data therefrom passes through the column memory register 318 of the End Column Controller 250, its associated two-way data selector 306 and onto the end column data return line 270. The data is then transferred by the dual data transmitter block 310 of the Mode Decoder 252 onto the serial data DI line 46. It should be understood that these two basic utility modes can be combined so as to provide for the simultaneous exchange of data between the Control Processor 10 and the column memory regisciated with the Corner Pseudo-Module 246 to the remainder of the Elemental Processor Data Bus 66 in substantially the full array shorted mode. The second data transmitter of the Corner Pseudo-Module 246 is disabled by the Array Data Enable signal as provided on the ADE programmable input line 286, thereby preventing any possible data conflict on the Corner Pseudo-Module's Elemental Processor Data Bus 66. The data received therefrom is gated through the decoder block 308 of the Mode Decoder 252 to each of the four-way data selector/transmitters 320 of the Column Controllers 248, 250 and therefrom to the remainder of the pseudo-module array in the full array shorted mode. This corner to full array shorted mode permits the generation of an image data set of common data words during a standard Array Processor Level Shift Operation. Clearly, the generated image data set is data dependent in that its common data word is derived from a single data word previously present within an originating image data set. It should also be clear that any data word present within an originating image data set can be selected as the common data word by performing an appropriate number of standard Lateral Shift Operations, as described in Section III, B, supra, on the originating image data set. This corner-to-full-array shorted mode is useful in generating a data dependent common value image data set that can be then used to add or remove the common value from an image data set, itself or another, so as to normalize the data contained therein.

The third of the basic shorted plane modes provides for the tranfer of data from the column memory registers 318 to their respective column data exchange subsystems and therefrom to their corresponding Elemental Processor Data Busses 66. In this column shorted mode, data is synchronously clocked from the column memory registers 318, through their associated three-way data selectors 304 and two-way data selector 306 to the four-way data selector/transmitters 320 of the Column Controllers 248, 250. The four-way data selector/transmitters 320, as enabled by the Memory Register Data Return Enable signal generated by the decoder block 308 of the Mode Decoder 252, transfers the data to their respective Column Data Exchange Subsystem Data Busses 256. The second data transmitters of the Pseudo-Modules 242, 244, 246, as enabled by the output signal provided on the 0 programmable input lines 330, 330', then transfer the data to their associated Elemental Processor Data Exchange Subsystem Data Busses 66. Thus, as data is transferred out of the column memory registers 318 during a standard Array Processor Level Shift Operation, an image data set consisting of columns of common data corresponding to the separate data contained in the respective column memory registers 318 is created within the array processor 61. Such an image data set is useful as the multiplier image data set required in performing matrix multiplication.

The last of the basic shorted plane modes is a data dependent variant of the column shorted mode. It provides for the transfer of data obtained from the elemental processor data busses 66 associated with the Corner and Top Row Pseudo-Modules 244, 246 to those associated with the remainder of the pseudo-module array in substantially the column shorted mode. Thus, this mode can be referred to as a top row to column shorted mode. In this mode, all of the second data transmitters of the Corner and Top Row Pseudo-Modules 244, 246 are disabled by provision of both the Mode Select and Array Data Enable signals on the MS and ADE programmable input lines 288, 286. This allows data from the Elemental Processor Data Busses 66 associated with the Corner and Top Row Pseudo-Modules 244, 246 to be transferred to the four-way data selector/drivers 320 of their respective column controllers 248, 250 without data conflicts. The four-way data selector/transmitters 320, as enabled by the top row data return enable signal generated by the decoder block 308 of the Mode Decoder 252, transfers this data to their associated Column Data Exchange Subsystem Data Busses 256. The data is transferred therefrom through the second data transmitters of the Standard Pseudo-Modules 242, as enabled by the Output signal provided on the O programmable input line 330, to their associated Elemental Processor Data Busses 66. Consequently, the top row to column shorted mode permits an image data set to be created within the Array Processor 61 consisting of identical rows of data that are simultaneously copied from the top row of data present in an originating image data set during a standard level Shift Operation. This mode is of particular use in matrix multiplication where the multiplicand matrix is not simultaneously present within the control processor 10. The data dependent quality of the top row to column shorted mode obviates the need to transfer the multiplicand matrix to the Control Processor 10 in order to determine the multiplier matrix needed to perform the multiplication.

It should be understood that within an array processor 61, the orientation of the Shorted Plane pseudo-module array with respect to the module arrays of the other functional planes present within the Array Processor 61 is not critical. Thus, several Shorted Functional Planes can be provided within the Array Processor 61 having column orientations orthogonal to one another. This effectively allows the Array Processor 61 to perform both column shorted and row shorted operations within the Array Processor 61. It should also be understood that the basic shorted plane modes involving data dependent operations require the use of masking images to prevent data conflicts on the Elemental Processor Data Exchange Subsystem Data Busses 66 associated with the portion of the shorted plane pseudo-module array transmitting the shorted data. The use of an appropriate masking image is illustrated in the example provided in Section IV,F, below.

The last two basic Shorted Plane operations can be referred to as ORed data modes. These modes permit the Control Processor 10 to quickly obtain an indication of the nature of the data present within either an entire image data set or the individual columns of data thereof. The ORed data full array shorted mode collects the OR of all the data present on the Elemental Processor Data Exchange Subsystem Data Busses 66 and provides the result to the Control Processor 10 via the serial data DI line 46. More specifically, the data present on the Elemental Processor Data Busses 66 is received by the first data transmitters of the Pseudo-Modules 242, 244, 246, as enabled by the Input signal provided on the I programmable input lines 328. The data is inverted by the open collector output buffer 86 of the first data transmitter thereby causing the state of their respective Column Data Busses 256 to reflect the NOR of the data present on the associated Elemental Processor Data Busses 66. This data is successively ANDed with the corresponding data of the precedingly adjacent columns of the pseudo-module array and ultimately provided to the Mode Decoder 252 wherein it is inverted by the inverter 314 and transferred by the dual data transmitter block 310 to the serial data DI line 46. Consequently, if the data present on any of the Elemental Processor Data Busses 66 is a logical 1 then the state of the DI line 46 will also be a logical 1. This operation is of particular use in quickly determining whether an image data set contains any non-zero data.

The second basic ORed data mode provides for a column oriented version of the ORed full array shorted mode. In the ORed data column shorted mode the data present on the respective Column Data Exchange Subsystem Data Busses 256 is transferred to their corresponding column memory registers 318 via the inverters 322 and the three-way data selectors 304 of the precedingly adjacent Standard Column Controllers 248 or the two-way data selector 298 of the Mode Decoder 252. Thus, by sequentially providing data on the Elemental Processor Data Busses 66 associated with each of the respective pseudo-module columns, the OR of the column data is synchronously shifted into their respective column memory registers 318. The column memory register data can then be transferred to the Control Processor 10 by a column memory register to serial data in operation. The data from each column memory register 318 thereby provides the Control Processor 10 with a direct indication as to whether each column of an image data set contains non-zero data and, further, the particular bit position of the non-zero bit data. This operation is of particular use once an ORed data full array shorted mode operation has been performed indicating that non-zero data exists within an image data set. The ORed data column shorted mode operation then allows the non-zero data to be localized both as to the column it is present in and its bit position within the column data. Naturally, a second Shorted Functional Plane 240 present within the Array Processor 61 having orthogonally oriented pseudo-module columns could be used to still further localize the non-zero data by localizing the row in which the non-zero data exists.

F. Example

The above described basic operations of the Shorted Functional Plane 240 within an Array Processor 61 can be used to greatly expedite the processing of image data in any number of image processing applications. Naturally, the operation of the Shorted Functional Plane 240 is not limited to those basic operations described above. However, by sequentially or concurrently combining the basic modes of operation, all of the useful operational modes of the Shorted Functional Plane 240 can be constructed. To illustrate the use of a Shorted Functional Plane 240 within a Array Processor 61, an example is provided below.

Data Dependent Column Shorted Operation Example

The following "program" illustrates the use of a Shorted Functional Plane 240 in performing a top row to column shorted mode operation so as to generate a data dependent image data set. An originating image data set is provided in one Memory Functional Plane (MEM 1) while a second Memory Functional Plane (MEM 2) is used as intermediate image data set storage. A third Memory Functional Plane (MEM 3) acts as the destination storage for the image data set generated by the Shorted Functional Plane 240. An I/O Functional Plane is used to receive and store a mask image data set provided by the Control Processor 10. Finally, a single Shorted Functional Plane 240 (SFP 1) is provided to perform the top row to column shorted mode operation.

For purposes of this example, the data words and the memory registers have a given length of 8 bits.

PROGRAM

| Line No. | Functional Plane Addressed | Corresponding Configuration Bus Lines Set Active | Control Processor Operation Performed |
|---|---|---|---|
| 1 | I/O 1 | CLK | Configuration Cycle |
| 2 | | | issue 1 CK pulse |
| 3 | | | reset configuration latches |
| 4 | I/O 1 | CLK, EXIO, EI, MSB | Configuration Cycle |
| 5 | | | issue N CK pulses synchronously with serial data string of all logical 1's provided on DO line |
| 6 | | | reset configuration latches |
| 7 | MEM 1 | CLK, $\bar{O}$, REC | Configuration Cycle |
| 8 | I/O 1 | $\bar{O}$, MSB | Configuration Cycle |
| 9 | MEM 2 | CLK, I | Configuration Cycle |
| 10 | | | issue 8 CK pulses |
| 11 | | | reset configuration latches |
| 12 | I/O 1 | O, MSB, POL | Configuration Cycle |
| 13 | MEM 2 | CLK, I, REC | Configuration Cycle |
| 14 | | | issue 8 CK pulses |
| 15 | | | reset configuration latches |
| 16 | MEM 2 | CLK, $\bar{O}$, REC | Configuration Cycle |
| 17 | SFP 1 | O, MS, ADE | Configuration Cycle |
| 18 | MEM 3 | CLK, I | Configuration Cycle |
| 19 | | | issue 8 CK pulses |
| 20 | | | reset configuration latches |

| Line Ref. No. | Comments |
|---|---|
| 1–3 | the most significant bits of the memory registers in the I/O 1 mask plane are cleared. |
| 4–6 | the most significant bits of the N top row memory registers in the I/O 1 mask plane are set, completing the formation of the mask image data set. |
| 7–11 | a level shift of the source image and the mask image data sets to the MEM 2 intermediate image data set storage plane, the data exchange subsystems functioning to AND the originating image (MEM 1) and the unclocked most significant bits of the mask image data set (I/O 1) together to form the intermediate data set, the top row of data therin corresponding to that of the originating image, the remaining rows containing all logical 0 data. |
| 12–15 | the mask image is inverted and level shifted again to the MEM 2 intermediate image data set storage plane where it is ORed with the recirculating data of the intermediate image data set, the resultant intermediate image data set having a top row of data corresponding to that of the originating image, the remaining rows containing all logical 1 data. |
| 16–20 | a level shift of the intermediate image to the MEM 3 image destination plane via the SFP 1 shorted functional plane, the separate data of the MEM 2 top row modules being shorted by the respective column data exchange subsystems to their associated elemental processor data exchange subsystems, the resultant destination image stored in MEM 3 having row data corresponding to the top row data of the source image, the data within each column being common. |

Considering a two column by four row elemental processor section of an Array Processor 61, the above program would develop the following intermediate and final data products.

| Program Point | MEM 1 | I/O 1* | MEM 2 | SFP 1** | MEM 3 |
|---|---|---|---|---|---|
| Initial | $a_1b_1$ | XX | XX | — | XX |
|  | $a_2b_2$ | XX | XX | — | XX |
|  | $a_3b_3$ | XX | XX | — | XX |
|  | $a_4b_4$ | XX | XX | — | XX |
| Line 4 | $a_1b_1$ | 00 | XX | — | XX |
|  | $a_2b_2$ | 00 | XX | — | XX |
|  | $a_3b_3$ | 00 | XX | — | XX |
|  | $a_4b_4$ | 00 | XX | — | XX |
| Line 7 | $a_1b_1$ | 11 | XX | — | XX |
|  | $a_2b_2$ | 00 | XX | — | XX |
|  | $a_3b_3$ | 00 | XX | — | XX |
|  | $a_4b_4$ | 00 | XX | — | XX |
| Line 12 | $a_1b_1$ | 11 | $a_1b_1$ | — | XX |
|  | $a_2b_2$ | 00 | 00 | — | XX |
|  | $a_3b_3$ | 00 | 00 | — | XX |
|  | $a_4b_4$ | 00 | 00 | — | XX |
| Line 16 | $a_1b_1$ | 00# | $a_1b_1$ | — | XX |
|  | $a_2b_2$ | 11 | 11 | — | XX |
|  | $a_3b_3$ | 11 | 11 | — | XX |
|  | $a_4b_4$ | 11 | 11 | — | XX |
| End | $a_1b_1$ | 11 | $a_1b_1$ | — | $a_1b_1$ |
|  | $a_2b_2$ | 00 | 11 | — | $a_1b_1$ |
|  | $a_3b_3$ | 00 | 11 | — | $a_1b_1$ |
|  | $a_4b_4$ | 00 | 11 | — | $a_1b_1$ |

XX = Unspecified data
*Data representing MSB only
**No data is stored in the SFP 1 plane
Effective data due to polarity inversion

G. Summary

Thus, a Column Shorted and Full Array Shorted Functional Plane for transferring data to and from the data exchange subsystems of a modular array processor has been disclosed. This functional plane permits the modular array processor to quickly and efficiently perform a number of specialized data processing operations such as matrix manipulations and non-zero data detection and location.

Obviously, many modifications and variations of the present invention are possible in light of the above description of the preferred embodiment. It is therefore to be understood that the invention may be practiced otherwise than as specifically described without departing from the spirit and the scope of the invention as set forth in the appended claims.

What is claimed is:

1. An array processor system comprising:
    (a) a control processor;
    (b) an array processor having a plurality of elemental processors configured in an M×N array of M elements by N elements, with the operation of said array processor being directed by said control processor; and
    (c) a replicated data transfer plane operatively associated with said control processor and said array processor for respectively exchanging data thereinbetween or between said elemental processors within said array processor, said replicated data transfer plane including:
        (i) a plurality of pseudo-modules corresponding to the M×N array of elemental processors, said pseudo-modules having means for transferring data to and from said elemental processors; and
        (ii) pseudo-module control logic having means for transferring data to and from said control processor, means for transferring data to and from all of said pseudo-modules, and means for allowing said control processor to select and direct all transfers of data through said replicated data transfer plane.

2. The system of claim 1 wherein said control logic means for transferring data to and from said pseudo-modules includes means for transferring data from said control logic simultaneously to all of said pseudo-modules.

3. The system of claim 2 wherein common data is transferred simultaneously to all of said pseudo-modules.

4. The system of claim 2 wherein said control logic means for transferring data to and from said pseudo-modules includes means for transferring data to said control logic from one or more of said pseudo-modules.

5. The system of claim 4 wherein said means for transferring data simultaneously to all of said pseudo-modules and said means for transferring data from one or more of said pseudo-modules are further characterized in that they operate simultaneously and with respect to the same data.

6. The system of claim 1 wherein said pseudo-modules are organized as a matrix array, said control logic includes a plurality of memory registers, each being associated with a separate column of said pseudo-module matrix array, and said means for transferring data to and from said control processor and said means for transferring data to and from said pseudo-modules are further characterized in that they transfer data to and from said column memory registers.

7. The system of claim 6 wherein said means for transferring data to and from said pseudo-modules includes means for transferring data from a number of said pseudo-modules to their respective ones of said column memory registers.

8. The system of claim 7 wherein said means for transferring data to and from said pseudo-modules is further characterized in that separate data is transferred from each of said column memory registers to their corresponding columns of said pseudo-modules such that the pseudo-modules of each column receive common data.

9. The system of claim 8 wherein the transfer of data to all the elements in each said column of said pseudo-modules is simultaneous.

10. The system of claim 1 wherein said means for transferring data to and from said pseudo-modules includes means for generating data indicative of the data transferred from said elemental processors to said pseudo-modules and means for transferring the generated data to said control logic.

11. The system of claim 10 wherein said means for transferring data to and from said control processor includes means for transferring the generated data from said control logic to said control processor.

12. The system of claim 10 wherein said pseudo-modules are organized as a matrix array, said control logic includes a plurality of memory registers, each being associated with a separate column of said matrix array, said means for generating data is further characterized in that it generates separate data indicative of the data transferred from said elemental processors to each of the columns of said pseudo-modules and that the separately generated data is transferred to their corresponding column memory registers in said control logic.

13. The system of claim 12 wherein said means for transferring data to and from said control processor includes means for transferring the separately generated data from the column memory registers of said control logic to said control processor.

14. The system of claim 10, 11, or 12 wherein said data is generated and transferred simultaneously for all pseudo-modules of the array.

15. In a modular array processor having a multiplicity of functional modules associated as a plurality of regular planar arrays, each thereby forming a functional plane, and further associated as a plurality of elemental processors, each having an operatively associated data bus, the operation of said array processor being directed by a control processor, said control processor including a data bus for exchanging data with said array processor, a function programmable shorted plane comprising:
(a) a plurality of pseudo-modules associated as a regular planar array each corresponding to the module arrays of said functional planes, each said pseudo-module including a data bus interface operatively interconnected to the data bus of its respective one of said elemental processors;
(b) a plurality of column controllers, each being operatively associated with a respective column of the planar array of said pseudo-modules, each including means for transferring data to and from its respective column of said pseudo-modules, and means for transferring data to other ones of said column controllers; and
(c) an input programmable mode decoder operatively associated with said control processor and with said column controllers, said mode decoder including means for enabling the transfer of data through said shorted plane corresponding to a number of modes of operation, said modes including the transfer of data from either said control processor or at least one of said module arrays through said shorted plane to either at least one other of said module arrays or said control processor, or both, said enabling means corresponding to each of said modes being selected by said control processor thereby permitting the function of said shorted plane to be programmed by said control processor.

16. The shorted plane of claim 15 wherein each of said column controllers is further comprised of a column memory register for temporarily storing data being transferred to and from its respective column of said pseudo-modules and that is received from other ones of said column controllers.

17. The shorted plane of claim 15 or 16 wherein said modes of operation include a transfer of common data from said control processor, through said shorted plane, and to the modules of at least one of said functional planes of said array processor.

18. The shorted plane of claim 17 wherein said transfer of common data is simultaneous to all the modules of at least one of said functional planes so as to substantially reduce the time necessary to distribute data to said array processor.

19. The shorted plane of claim 15 or 16 wherein said modes of operation include a transfer of data from one or more of said modules, through said shorted plane, and to the modules of one or more of said functional planes.

20. The shorted plane of claim 19 wherein said transfer of data from one or more of said modules is of common data from one of said elemental processors simultaneously to all other ones of said elemental processors thereby substantially reducing the time necessary to replicate data within said arra processor.

21. The shorted plane of claim 19 wherein said transfer of data from one or more of said modules is from a plurality of said elemental processors, each being associated with a separate column of the module arrays of said functional planes and providing separate data, the data being respectively transferred in common to all of the other ones of said elemental processors associated with the respective columns of said functional planes so as to substantially reduce the time necessary to replicate column data within the functional plane column modules of said array processor.

22. The shorted plane claim 15 or 16 wherein said modes of operation include a transfer of data in a single transfer step from said array processor to said control processor, the data being the logical OR of data provided by all of the elemental processors of said array processor, so as to provide said control processor with an indication of the nature of the data present within said array processor.

23. The shorted plane of claim 15 or 16 wherein said modes of operation include a transfer of data from the respective module array columns of said functional planes to said control processor, the respective data provided by said module array columns being the logical OR of the data provided by the elemental processors associated with the respective module array columns of said array processor, so as to provide said control processor with an indication of the nature of the data present within each of the module array columns of said array processor.

24. In a modular array processor having a multiplicity of modules associated as a plurality of planar arrays, each thereby forming a functional plane, and further associated as a plurality of elemental processors, the operation of said modular array processors being directed by a control processor, a function programmable shorted plane comprising:
(a) means for transferring data from said control processor commonly to all of the modules of any number of said functional planes;
(b) means for transferring data from a module of one said functional plane commonly to all of the modules of any number of other said functional planes;
(c) means for transferring separate data from said control processor to respective columns of the module arrays of any number of said functional planes, each of said respective columns receiving common data; and
(d) means for transferring separate data from a module of each column of modules within the module array of one said functional plane respectively to all of the modules within the corresponding columns of the module arrays of any number of other said functional planes, each of said respective columns commonly receiving the separate data corresponding to their respective column module of said one functional plane, each said means being responsive to said control processor such that said control processor may selectively direct the transfer of common data to the module arrays, or separate columns thereof, of any number of functional planes.

25. The function programmable shorted plane of claim 24 further comprising:
(a) means for transferring the OR of the respective data from all of the modules of any number of said functional planes to said control processor; and (b) means for transferring the OR of the respective data from all of the modules within the corresponding columns of the module arrays of any number of said functional planes, in a single transfer step each of said means being responsive to said control processor such that said control processor may selectively direct the transfer of data processed by said shorted plane from said array processor to said control processor, the processed data providing said control processor with an indication of the nature and quality of the data contained in said array processor.

26. In an array processor system including a control processor and an array processor having a plurality of elemental processors, the operation of said array processor being directed by said control processor, a method of transferring data within said system comprising the steps of:
   (a) receiving data within said array processor;
   (b) transferring said data onto a common bus for said elemental processors;
   (c) forming separate replications of the data on said common bus; and
   (d) presetting said common bus to transmit said replications of the data from said common bus simultaneously to the elemental processors of said array processor.

27. In an array processor system including a control processor and an array processor having a plurality of elemental processors and further having a replicated data transfer plane operatively associated with said elemental processors and with said control processor so as to provide for the transfer of data thereinbetween, the operation of said array processor being directed by said control processor, a method of transferring data within said system comprising the steps of:
   (a) transferring said data from said replicated data transfer plane onto a common bus which is operatively associated with each of a selected plural number of elemental processors;
   (b) forming replications of the data on said common bus; and
   (c) presetting said common bus to transfer said replicated data substantially simultaneously to each of said preselected plural number of elemental processors from said common bus in a single transfer step.

28. The method of claim 27 wherein the step of transferring data is performed a plurality of times with respect to differing preselected numbers of elemental processors.

29. The method of claim 28 wherein the plurality performed step of transferring data to said differing preselected numbers of elemental processors is further characterized in that the transfers of data are simultaneous to said numbers of elemental processors.

30. The method of claim 27 or 28 further comprising the step of transferring data from said control processor to said replicated data transfer plane.

31. The method of claim 27 or 28 further comprising the step of transferring data from a select one of said elemental processors to said replicated data transfer plane.

32. The method of claim 27 or 28 further comprising the step of transferring data from a selected plural number of said elemental processors to said replicated data transfer plane.

33. In an array processor system including a control processor and an array processor having a plurality of elemental processors and further having a replicated data transfer plane operatively associated with said elemental processors and with said control processor so as to provide for the transfer of data thereinbetween, the operation of said array processor being directed by said control processor, a method of transferring data within said system comprising the steps of:
   (a) transferring data under the control of the control processor from each of a preselected plural number of said elemental processors substantially simultaneously to a common bus; and
   (b) presetting said common bus to transfer said data from said common bus to said replicated data transfer plane.

34. The method of claim 33 wherein said steps of transferring data are performed a plurality of times, and the identities of the preselected plural number of said elemental processors is changed for each such data transfer.

35. The method of claim 33 or 34 wherein the step of generating data is further characterized in that the data generated is the logical OR of the data transferred.

36. The method of claim 33 or 34 further comprising the step of transferring the generated data to said control processor.

* * * * *